United States Patent
Jun et al.

(10) Patent No.: US 12,075,183 B2
(45) Date of Patent: Aug. 27, 2024

(54) DISPLAY CONTROL DEVICE

(71) Applicant: LG ELECTRONICS INC., Seoul (KR)

(72) Inventors: Sungbae Jun, Seoul (KR); Baik Han, Seoul (KR); Dohyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/906,341

(22) PCT Filed: Mar. 22, 2021

(86) PCT No.: PCT/KR2021/003473
§ 371 (c)(1),
(2) Date: Sep. 14, 2022

(87) PCT Pub. No.: WO2021/194177
PCT Pub. Date: Sep. 30, 2021

(65) Prior Publication Data
US 2023/0146403 A1 May 11, 2023

Related U.S. Application Data

(60) Provisional application No. 62/993,618, filed on Mar. 23, 2020.

(51) Int. Cl.
*H04N 5/268* (2006.01)
*B60R 1/24* (2022.01)
(Continued)

(52) U.S. Cl.
CPC ............... *H04N 5/268* (2013.01); *B60R 1/24* (2022.01); *B60R 1/25* (2022.01); *B60R 1/26* (2022.01);
(Continued)

(58) Field of Classification Search
CPC ...... H04N 5/268; H04N 5/2628; H04N 7/181; B60R 1/24; B60R 1/25; B60R 1/26;
(Continued)

(56) References Cited

U.S. PATENT DOCUMENTS

2014/0196098 A1* 7/2014 Wen .................. H04N 21/41422
725/75
2015/0015479 A1* 1/2015 Cho ...................... G06F 3/1423
345/156
(Continued)

FOREIGN PATENT DOCUMENTS

JP 2018195134 12/2018
KR 1020150072074 6/2015
(Continued)

OTHER PUBLICATIONS

PCT International Application No. PCT/KR2021/003473, International Search Report dated Jul. 1, 2021, 2 pages.

*Primary Examiner* — Farzana Hossain
(74) *Attorney, Agent, or Firm* — LEE, HONG, DEGERMAN, KANG & WAIMEY

(57) ABSTRACT

The present invention relates to a display control device. A display control device according to an embodiment of the present invention is characterized by comprising: an interface unit which performs data communication with a plurality of displays provided in a vehicle; and a processor which controls the displays provided in the vehicle by means of the interface unit, wherein the processor receives information about a preset input applied to at least one of the plurality of displays provided in the vehicle, and controls the plurality of displays in response to the preset input so that an operation corresponding to the preset input is performed.

19 Claims, 23 Drawing Sheets

(51) Int. Cl.
*B60R 1/25* (2022.01)
*B60R 1/26* (2022.01)
*G06F 3/01* (2006.01)
*G06F 3/0488* (2022.01)
*G06F 3/14* (2006.01)
*H04N 5/262* (2006.01)
*H04N 7/18* (2006.01)

(52) U.S. Cl.
CPC .......... *G06F 3/0488* (2013.01); *G06F 3/1423* (2013.01); *H04N 5/2628* (2013.01); *H04N 7/181* (2013.01); *B60R 2300/105* (2013.01); *B60R 2300/207* (2013.01); *G06F 3/017* (2013.01); *G06F 2203/04808* (2013.01)

(58) Field of Classification Search
CPC ......... B60R 2300/105; B60R 2300/207; G06F 3/0488; G06F 3/1423; G06F 3/017; G06F 2203/04808; G06F 3/0484; G06F 3/04883; B60K 35/00; B60K 37/06; B60K 2370/1468; B60K 2370/152; B60K 2370/182; B60W 40/02; B60W 50/00; B60W 50/14; B60W 2050/146; B60Y 2400/92

See application file for complete search history.

(56) References Cited

U.S. PATENT DOCUMENTS

| | | | |
|---|---|---|---|
| 2016/0328272 A1* | 11/2016 | Ahmed | G06F 9/4881 |
| 2017/0166056 A1 | 6/2017 | Buttolo et al. | |
| 2017/0351422 A1* | 12/2017 | Wild | G06F 3/04883 |
| 2018/0032300 A1* | 2/2018 | Singh | G06F 3/013 |
| 2019/0176625 A1* | 6/2019 | Kim | B60K 37/02 |
| 2020/0139812 A1* | 5/2020 | Johnson | B60K 35/00 |
| 2020/0286450 A1* | 9/2020 | Furuya | G06T 13/00 |
| 2023/0045996 A1* | 2/2023 | Ahn | G06F 3/017 |

FOREIGN PATENT DOCUMENTS

| | | |
|---|---|---|
| KR | 1020160140033 | 12/2016 |
| KR | 1020170007980 | 1/2017 |

* cited by examiner

DISPLAY CONTROL DEVICE

CROSS-REFERENCE TO RELATED APPLICATION(S)

This application is the National Stage filing under 35 U.S.C. 371 of International Application No. PCT/KR2021/003473, filed on Mar. 22, 2021, and also claims the benefit of U.S. Provisional Application No. 62/993,618 filed on Mar. 23, 2020, the contents of which are all incorporated by reference herein in their entirety.

TECHNICAL FIELD

The present disclosure relates to a display control device capable of controlling a display provided in a vehicle.

BACKGROUND ART

A vehicle is an apparatus capable of moving a user in the user-desired direction. A representative example of a vehicle may be an automobile.

Meanwhile, for convenience of a user using a vehicle, various types of sensors and electronic devices are provided in the vehicle. Specifically, a study on an Advanced Driver Assistance System (ADAS) is actively undergoing. In addition, an autonomous vehicle is actively under development.

Meanwhile, as the development of the advanced driving assist system (ADAS) is actively undergoing in recent time, development of a technology for optimizing user's convenience and safety while driving a vehicle is required.

In recent years, various technologies have been actively developed for autonomous driving of vehicles.

With the progress of the development of autonomous driving technology, numerous changes have been made to displays provided inside a vehicle. For example, while only certain displays such as clusters and CIDs were provided in vehicles in the conventional art, displays mounted in vehicles are getting more diverse in shape, size, and number. Using such displays, vehicle passengers are able to view, manipulate, and receive various information inside a vehicle.

The increase in the number of displays inside a vehicle is creating user needs for efficiently managing and manipulating displays.

DISCLOSURE OF INVENTION

Technical Problem

An aspect of the present disclosure is to provide a display control device capable of controlling a display provided in a vehicle in an optimal manner.

Another aspect of the present disclosure is to provide a display control device capable of intuitively manipulating a plurality of displays provided in a vehicle.

The aspects of the present disclosure are not limited to the foregoing, and other aspects not mentioned herein will be able to be clearly understood by those skilled in the art from the following description.

Solution to Problem

According to an exemplary embodiment of the present disclosure, there is provided a display control device including: an interface unit which performs data communication with a plurality of displays provided in a vehicle; and a processor which controls the displays provided in the vehicle by means of the interface unit, wherein the processor receives information about a preset input applied to at least one of the plurality of displays provided in the vehicle, and controls the plurality of displays in response to the preset input so that an operation corresponding to the preset input is performed.

In the embodiment, the processor performs an operation corresponding to the preset input, based on information on locations where the plurality of displays is provided.

In the embodiment, the preset input includes an input that is applied in a certain direction from one point and then released at another point, and the processor controls the plurality of displays so as to perform an operation corresponding to the preset input, based on at least either the positions of the plurality of displays, the display where the preset input is applied, or the certain direction in which the preset input is applied.

In the embodiment, when a preset input is applied to the at least one display, the processor switches a screen of another display positioned in the direction in which the preset input is applied, based on location information of the plurality of displays.

In the embodiment, while first screen information is being outputted on the first display, among the plurality of displays, and second screen information is being outputted on the second display different than the first display, the processor controls the second display so as to output the first screen information being outputted on the first display to the second display positioned in the first direction with respect to the first display, based on reception of a swipe input applied to the first display in the first direction.

In the embodiment, substantially the same screen is outputted on the first display and the second display, based on reception of the swipe input.

In the embodiment, upon receiving a swipe input applied to the first display or the second display in a second direction opposite to the first direction, the processor restores the first screen information being outputted on the second display to the second screen information.

In the embodiment, when a preset input is applied to the at least one display, the processor switches a screen of another display positioned in a direction opposite to the direction in which the preset input is applied, based on location information of the plurality of displays.

In the embodiment, while first screen information is being outputted on a first display, among the plurality of displays, and second screen information is being outputted on a second display which is positioned in a first direction of the first display, the processor controls the first display so that the second screen information being outputted on the second display is outputted on the first display, based on reception of a swipe input on the first display, in a second direction opposite to the first direction.

In the embodiment, upon receiving a swipe input applied to the first display or the second display in the first direction opposite to the second direction, the processor restores the second screen information being outputted on the first display to the first screen information.

In the embodiment, the processor determines a display whose screen is to be switched, based on the direction in which the preset input is applied and the position of the display to which the preset input is applied.

In the embodiment, when the preset input is applied to a certain display in one direction, if there is another display in one direction of the certain display, the processor switches a screen of the another display.

In the embodiment, when the preset input is applied to a certain display in one direction, if there is no other display in one direction of the certain display, the processor switches a screen of the certain display.

In the embodiment, if there are at least two displays in the opposite direction of the direction in which the preset input is applied, screen information being outputted on the at least two displays is outputted on the display to which the preset input is applied.

In the embodiment, the screen information being outputted on the at least two displays overlaps the screen information being outputted on the display to which the preset input is applied.

In the embodiment, the interface unit is configured to receive images from a plurality of cameras provided in the vehicle, wherein, based on a direction in which the preset input is applied to a display provided in the vehicle, the processor receives images from different cameras and outputs the images to the display to which the preset input is applied.

In the embodiment, when a preset input is applied to the display in a first direction, the processor receives an image from a first camera installed at a position opposite to the direction, among the plurality of cameras, and displays the image on the display, and when a preset input is applied to the display in a second direction different from the first direction, the processor receives an image from a second camera installed at a position opposite to the second direction, among the plurality of cameras, and outputs the image on the display.

In the embodiment, upon receiving a preset input of a first type, the processor switches the screen being outputted on the display to the image transmitted from the camera, and upon receiving a preset input of a second type different from the first type, the processor outputs the image transmitted from the camera in such a way as to overlap some region of the display.

In the embodiment, upon receiving a preset input of a third type different from the first and second types, the processor reduces the screen being outputted on the display and outputs the reduced screen in such a way as to overlap the image transmitted from the camera.

In the embodiment, the processor outputs the reduced screen at different positions, based on the direction in which the preset input of the third type is applied.

Specific details of other embodiments are included in the detailed description and the drawings.

Advantageous Effects of Invention

In accordance with an embodiment of the present disclosure, one or more of the following defects are provided.

First, the present disclosure provides a user interface capable of controlling a plurality of displays provided in a vehicle in an optimal manner.

Second, the present disclosure provides an optimized UI/UX capable of intuitively performing screen sharing/mirroring between a plurality of displays provided in a vehicle.

Third, the present disclosure provides a new display system with improved compatibility so as to facilitate screen sharing between a plurality of displays even if they have different OSs.

The effects obtained by the present disclosure are not limited to the aforementioned, and other effects not mentioned can be clearly understood on the following description by those skilled in the art to which the present disclosure pertains.

MODE FOR THE INVENTION

Description will now be given in detail according to one or more implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an implementation disclosed herein may be understood as a conception including cars, motorcycles and the like. Hereinafter, the vehicle will be described based on a car.

The vehicle according to the implementation may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
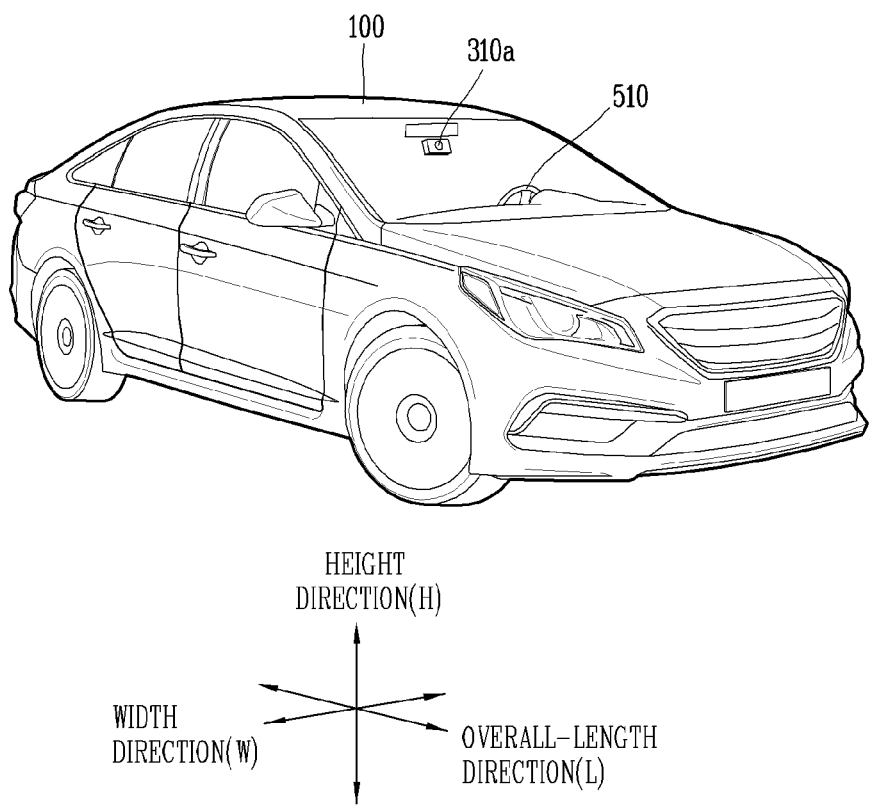
FIG. 1 is a diagram illustrating appearance of a vehicle in accordance with an implementation.

FIG. 1 is a diagram illustrating appearance of a vehicle in accordance with an implementation.

Figure 2:
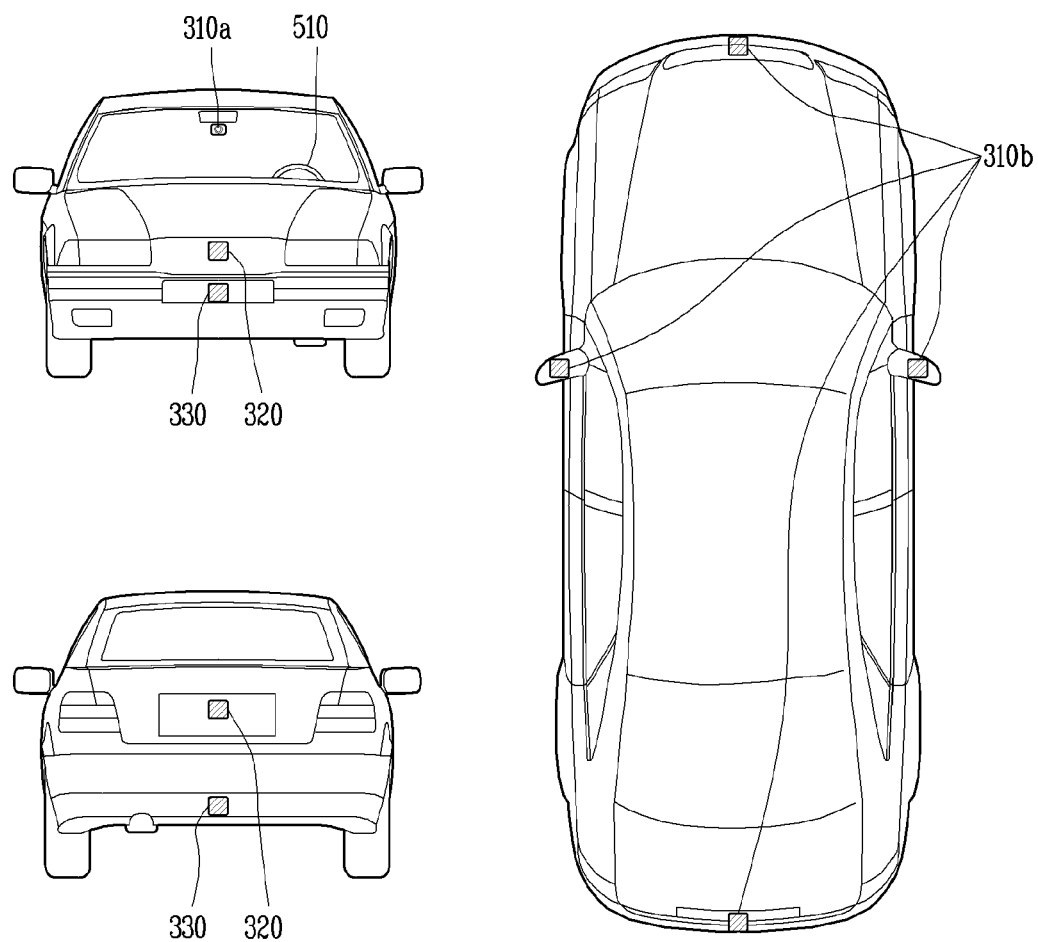
FIG. 2 is a diagram illustrating an outside of the vehicle at various angles in accordance with the implementation.

FIG. 2 is a diagram illustrating an outside of the vehicle at various angles in accordance with the implementation.

Figure 3:
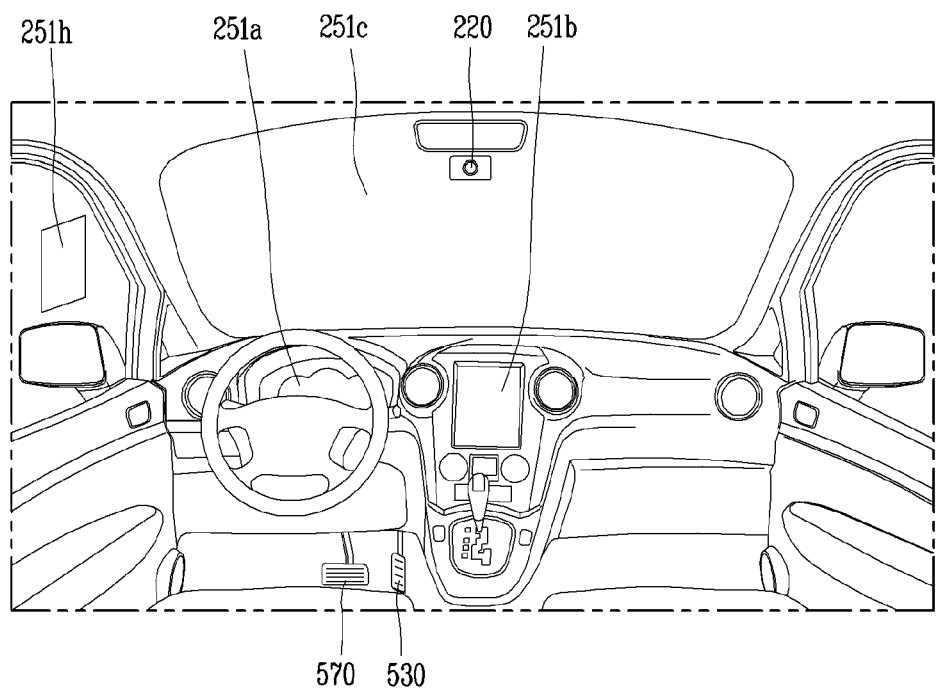
FIGS. 3 and 4 are diagrams illustrating an inside of the vehicle in accordance with the implementation.
Figure 4:
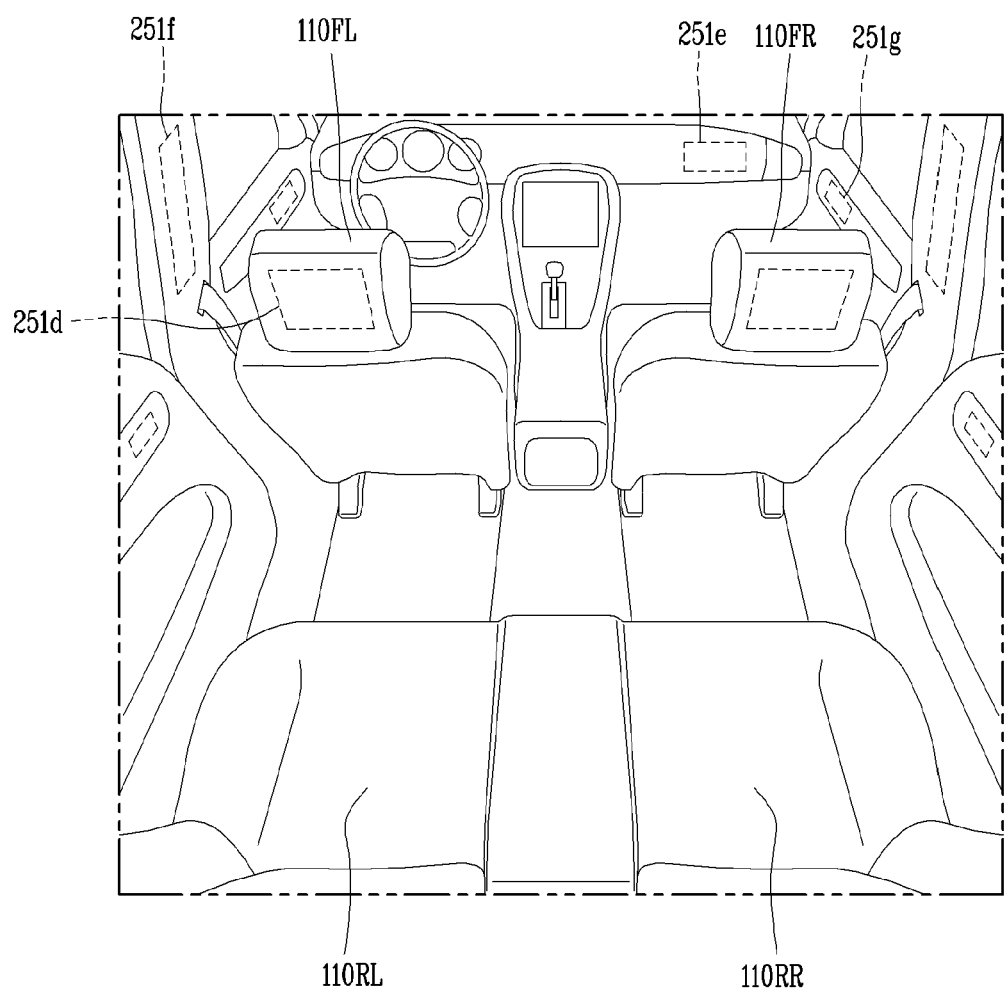

FIGS. 3 and 4 are diagrams illustrating an inside of the vehicle in accordance with the implementation.

Figure 5:
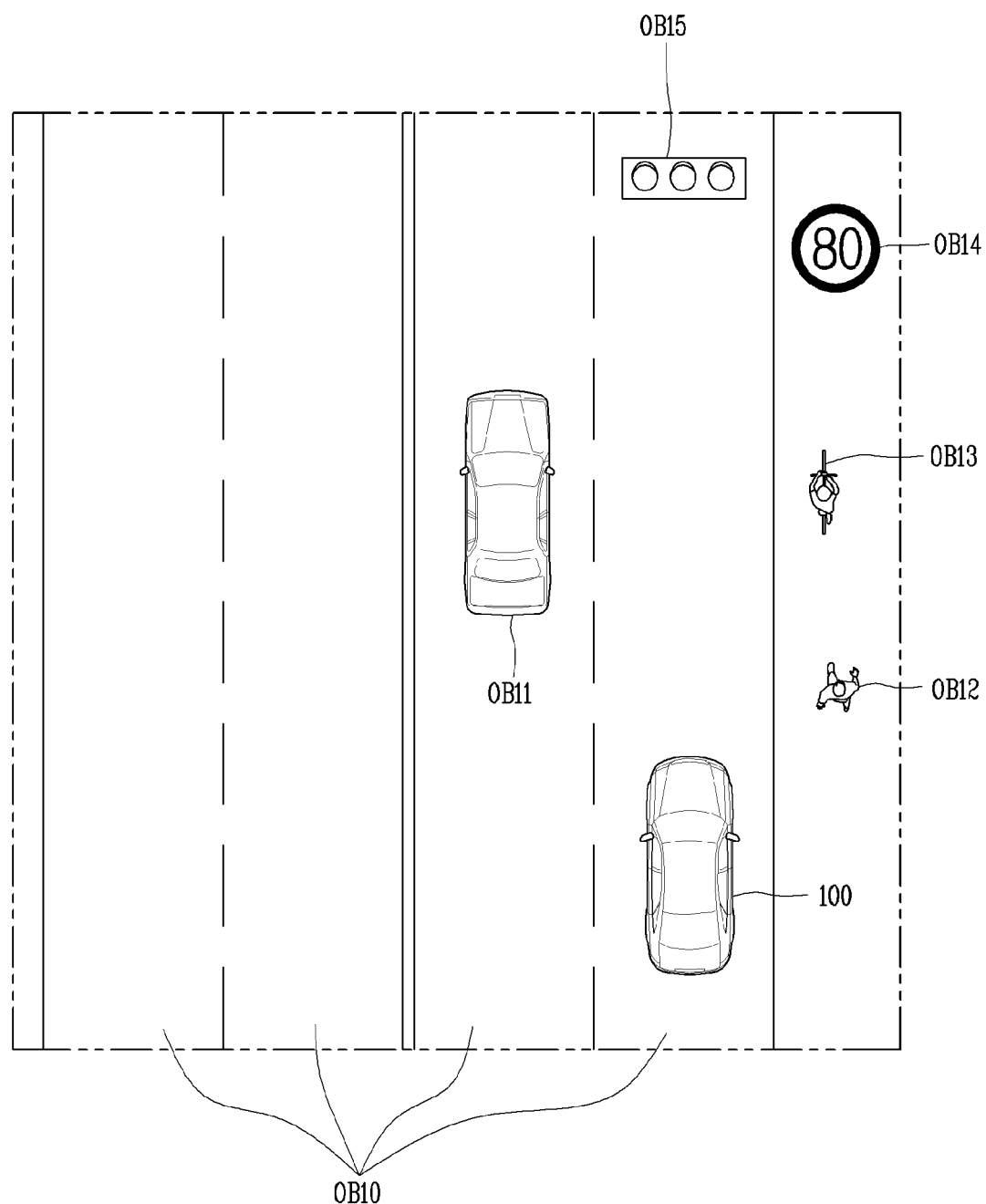
FIGS. 5 and 6 are reference views illustrating objects in accordance with an implementation.
Figure 6:
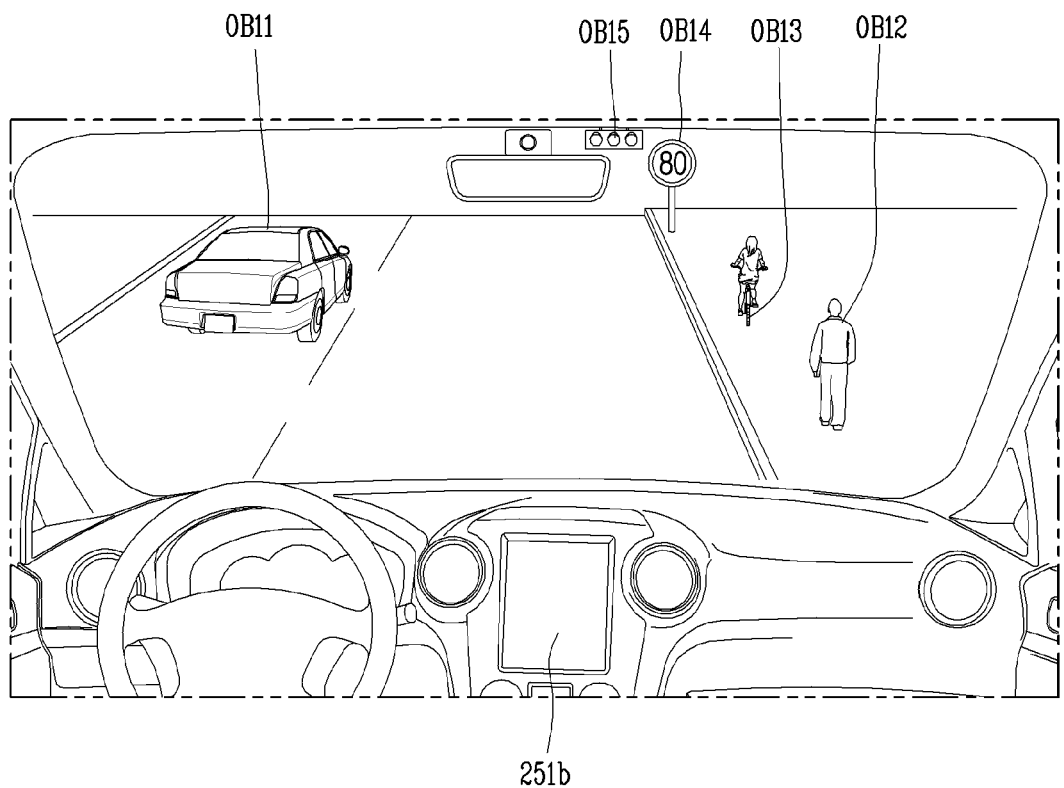

FIGS. 5 and 6 are reference views illustrating objects in accordance with an implementation.

Figure 7:
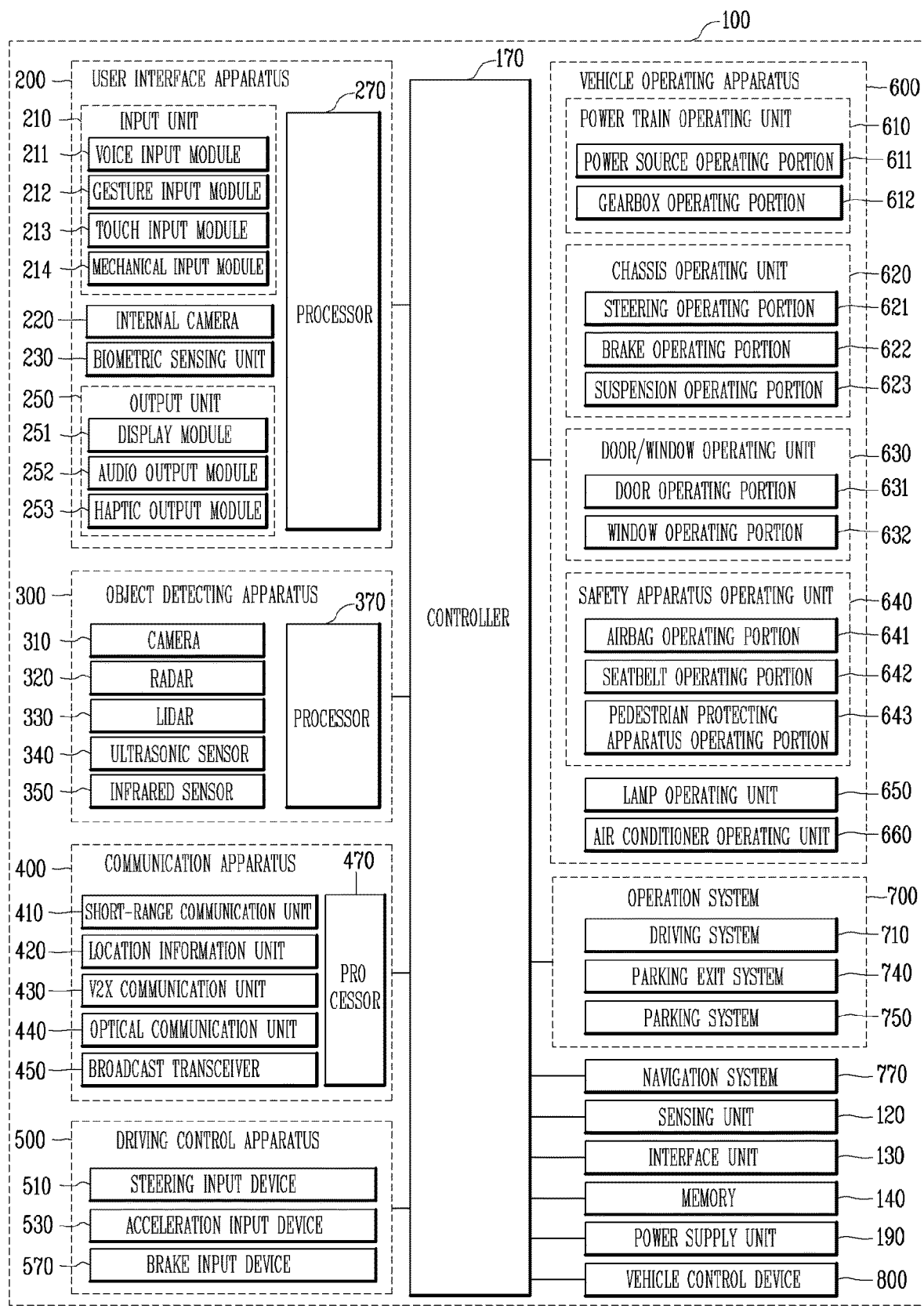
FIG. 7 is a block diagram illustrating a vehicle in accordance with an implementation.

FIG. 7 is a block diagram illustrating a vehicle in accordance with an implementation.

As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

In some implementations, the vehicle 100 may be switched into an autonomous (driving) mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous mode into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous mode into the manual mode based on information, data or signal provided from an external device.

When the vehicle 100 is driven in the autonomous mode, the vehicle 100 may be driven based on an operation system 700.

For example, the vehicle 100 may be driven based on information, data or signal generated in a driving system 710, a parking exit system 740 and a parking system 750.

When the vehicle 100 is driven in the manual mode, the vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

In some implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250, and a processor 270.

In some implementations, the user interface apparatus 200 may further include other components in addition to the components described, or may not include some of the components described.

The input unit 200 may allow the user to input information. Data collected in the input unit 120 may be analyzed by the processor 270 and processed as a user's control command.

The input unit 200 may be disposed inside the vehicle. For example, the input unit 200 may be disposed on one region of a steering wheel, one region of an instrument panel, one region of a seat, one region of each pillar, one region of a door, one region of a center console, one region of a headlining, one region of a sun visor, one region of a windshield, one region of a window, or the like.

The input unit 200 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The audio input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

In some implementations, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method, or a disparity method.

The touch input module 213 may convert the user's touch input into an electric signal. The converted electric signal may be provided to the processor 270 or the controller 170.

The touch input module 213 may include a touch sensor for detecting the user's touch input.

In some implementations, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel, and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing unit 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display 251, an audio output module 252 and a haptic output module 253.

The display 251 may output graphic objects corresponding to various types of information.

The display 251 may include at least one of a liquid crystal display (LCD), a thin film transistor-LCD (TFT LCD), an organic light-emitting diode (OLED), a flexible display, a three-dimensional (3D) display and an e-ink display.

The display 251 may be inter-layered or integrated with a touch input module 213 to implement a touch screen.

The display 251 may be implemented as a head up display (HUD). When the display 251 is implemented as the HUD, the display 251 may be provided with a projecting module so as to output information through an image which is projected on a windshield or a window.

The display 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display, and a transparent LED display. The transparent display may have adjustable transparency.

Meanwhile, the user interface apparatus 200 may include a plurality of displays 251a to 251g.

The display 251 may be disposed on one region of a steering wheel, one region 521a, 251b, 251e of an instrument panel, one region 251d of a seat, one region 251f of each pillar, one region 251g of a door, one region of a center console, one region of a headlining or one region of a sun visor, or implemented on one region 251c of a windshield or one region 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

In some implementations, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

Meanwhile, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB10 may be a driving lane, a lane next to the driving lane or a lane on which another vehicle comes in an opposite direction to the vehicle 100. The lanes OB10 may include left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB12 may refer to a vehicle (transportation facility) that is located near the vehicle 100 and moves using two wheels. The two-wheeled vehicle OB12 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill and the like.

Meanwhile, objects may be classified into a moving object and a fixed object. For example, the moving object may include another vehicle or a pedestrian. The fixed object may be, for example, a traffic signal, a road, or a structure.

The object detecting apparatus 300 may include a camera 310, a radar 320, a LiDAR 330, an ultrasonic sensor 340, an infrared sensor 350, and a processor 370.

In some implementations, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

In some implementations, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

In some implementations, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

In some implementations, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

In some implementations, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. In some implementations, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. In some implementations, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

In some implementations, the vehicle operating apparatus 600 may further include other components in addition to the components described, or may not include some of the components described.

In some examples, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled.

The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

In some implementations, the operation system 700 may further include other components in addition to components to be described, or may not include some of the components to be described.

Meanwhile, the operation system 700 may include a processor. Each unit of the operation system 700 may individually include a processor.

In some implementations, the operation system may be a sub concept of the controller 170 when it is implemented in a software configuration.

Meanwhile, according to implementations, the operation system 700 may be implemented by at least one of the user interface apparatus 200, the object detecting apparatus 300, the communication apparatus 400, the vehicle operating apparatus 600, and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

In some implementations, the navigation system 770 may update prestored information by receiving information from an external device through the communication apparatus 400.

In some implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

In some implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Meanwhile, the vehicle 100 according to the present disclosure may include a display control device 800.

The display control device 800 may control at least one of those components illustrated in FIG. 7. From this perspective, the display control device 800 may be the controller 170.

Without a limit to this, the display control device 800 may be a separate device, independent of the controller 170. When the display control device 800 is implemented as a component independent of the controller 170, the display control device 800 may be provided on a part of the vehicle 100.

Meanwhile, the display control device 800 described herein may include all kinds of devices capable of controlling the vehicle, and may be, for example, a mobile terminal or an independent module (device or component). The display control device 800 and the vehicle 100 may be connected to each other so as to perform communication in a wired/wireless manner. In addition, the display control device 800 may control the vehicle 100 in various ways in a communication-connected state.

When the display control device 800 is a mobile terminal, the processor 830 described herein may be a controller of the mobile terminal.

Hereinafter, description will be given of an example that the display control device 800 is a component separate from the controller 170 for the sake of explanation. In this specification, functions (operations) and control methods described in relation to the display control device 800 may be executed by the controller 170 of the vehicle. That is, every detail described in relation to the display control device 800 may be applied to the controller 170 in the same/like manner.

Also, the display control device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, a description will be given in more detail of the components included in the display control device 800 according to an implementation of the present disclosure, with reference to the accompanying drawings.

Figure 8:
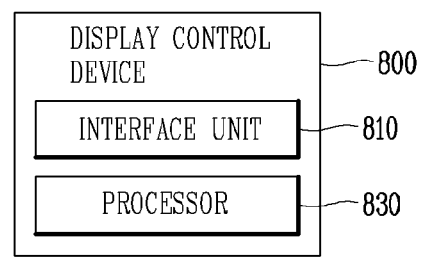
FIG. 8 is a conceptual diagram for explaining a display control device according to an embodiment of the present disclosure.

FIG. 8 is a conceptual diagram for explaining a display control device according to an embodiment of the present disclosure.

A display control device 800 related to the present disclosure may control a display 251 provided in a vehicle.

The display control device 800 may be connected to a vehicle so as to perform wired/wireless communication, in order to control components provided in the vehicle explained with reference to FIG. 7 and/or the display 251 provided in the vehicle.

To this end, the display control device 800 may include an interface unit 810 (or communication unit (not shown) which performs data communication with displays provided in the vehicle.

The interface unit 810 serves as a path to external devices connected to the vehicle 100. The interface unit 810 may include at least one of a wired/wireless headset port, an external charger port, a wired/wireless data port, a memory card port, a port for connecting a device having a user identification module, an audio I/O port, a video I/O port, and an earphone port. The display control device 800 may perform proper control related to connected components, in correspondence to the fact that the components (e.g., the display 251) included in the vehicle are connected to the interface unit 810.

As an example, the interface unit 810 of the display control device 800 may be connected to the interface unit 130 provided in the vehicle.

The interface unit 130 may serve as a passage with various kinds of external devices connected to the vehicle 100. For example, the interface unit 130 may have a port connectable to the display control device 800, and may be connected to the display control device 800 via the port. In this case, the interface unit 130 may exchange data with the display control device 800.

Meanwhile, the interface unit 130 may serve as a passage through which electrical energy is supplied to the connected display control device 800. When the display control device is electrically connected to the interface unit 130, the interface unit 130 may provide electrical energy supplied from the power supply unit 190 to the display control device under control of the controller 170.

Although not shown, the display control device 800 may further include a communication unit (not shown) configured to send and receive data through wired/wireless communication with a display in the vehicle.

The communication unit (not shown) may infer/apply what has been described above with respect to the communication device 400 equally/similarly.

The communication unit (not shown) may be communicatively connected to the communication device 400 provided in the vehicle, and perform communication to send and receive data to and from the display 251 provided in the vehicle.

For example, the display control device 800 and the vehicle 100 may be connected to enable wireless communication (or wired communication) through the communication unit. If the display control device 800 and the vehicle are wirelessly connected to enable wireless communication with each other by a user request or have ever been connected to enable wireless communication, they may be wirelessly connected to enable wireless communication with each other, based on the display control device accessing the inside of the vehicle.

The display control device 800 may control the display 251 in the vehicle through the communication unit.

Specifically, the display control device 800 may send the vehicle 100 a control signal for controlling the display 251 through the communication unit. Upon receiving the control signal, the vehicle 100 may perform a function/operation/control corresponding to the control signal.

On the contrary, in the present disclosure, the vehicle 100 is able to control the display control device 800. Specifically, the vehicle 100 may send the display control device 800 a control signal for controlling the display control device 800. In response to this, the display control device 800 may perform a function/operation/control corresponding to the control signal sent from the vehicle 100.

Also, the communication unit (not shown) may perform communication with an external device (e.g., a server, a cloud server (or a cloud), the internet, etc.) present outside the vehicle. Also, the communication unit may perform communication with other vehicles.

The processor 830 may control the display 251 provided in the vehicle 100 through the interface unit 810 (or the communication unit).

The processor 830 may receive information about a preset input applied to at least one of a plurality of displays provided in the vehicle.

Also, in response to a preset input, the processor 830 may control the plurality of displays so as to perform an operation corresponding to the preset input.

Figure 9:
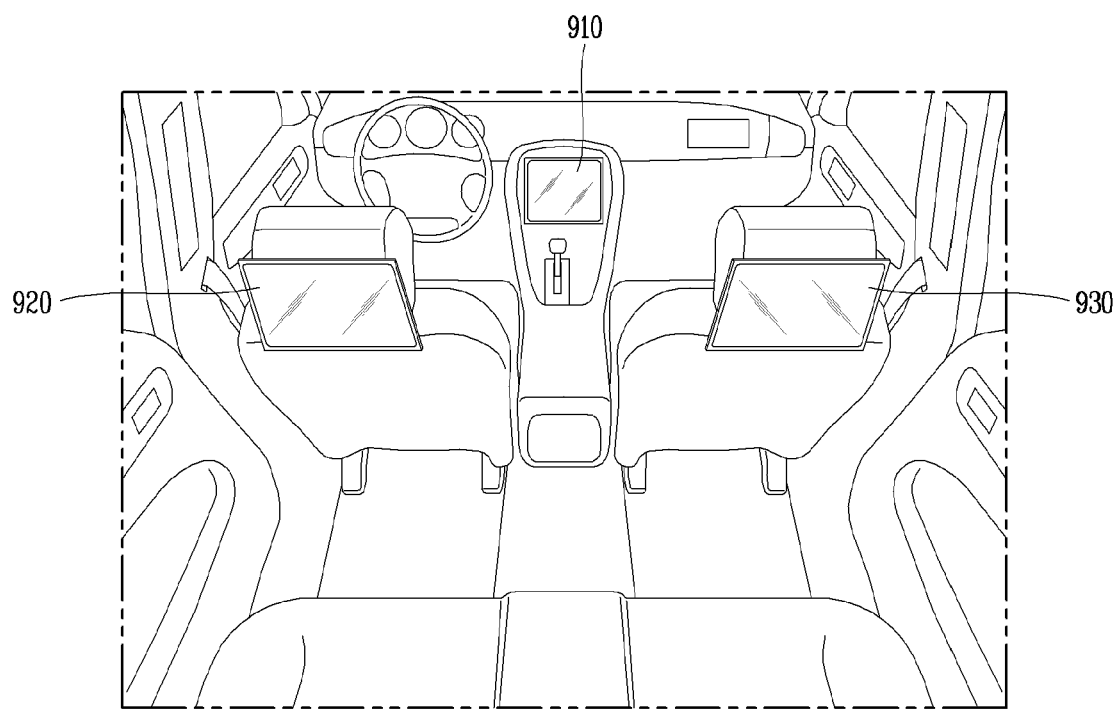
FIG. 9 is a conceptual diagram illustrating a plurality of displays provided in a vehicle, that are controlled by a display control device.

FIG. 9 is a conceptual diagram illustrating a plurality of displays provided in a vehicle, that are controlled by a display control device.

Referring to FIG. 9, the display control device 800 of the present disclosure may control a plurality of displays provided in the vehicle.

The plurality of displays may include a head unit display (first display) 910, RSE (rear-seat entertainment system) 1 (second display 920), RSE 2 (third display 930), and so on.

Also, a display provided in the vehicle may include a transparent display. The transparent display may be attached to a windshield or a window.

The display provided in the vehicle may be disposed on one area of a steering wheel, one area 251a, 251b, and 251e of an instrument panel, one area 251d of a seat, one area 251f of each pillar, one area 251g of a door, one area of a center console, one area of a headlining, one area of a sun visor, one area 251c of a wind shield, one area 251h of a window or the like.

Moreover, the display may include a cluster, a center information display (CID), a navigation device, and a head-up display (HUD).

The display may form an inter-layer structure with the touch sensor or may be integrally formed to realize a touch screen. The touch screen functions as an input unit 210 that provides an input interface between the vehicle 100 (or the display control device 800) and the user and also provides an output interface between the vehicle 100 (or the display control device 800) and the user.

Figure 10:
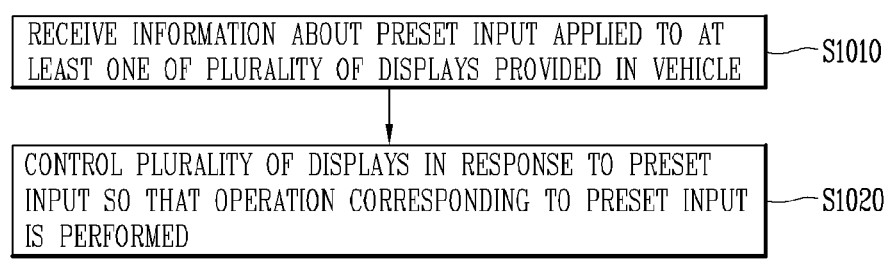
FIG. 10 is a flowchart for explaining a typical control method of the present disclosure.

FIG. 10 is a flowchart for explaining a typical control method of the present disclosure.

The processor 830 of the display control device 800 of the present disclosure may receive information about a preset input applied to at least one of a plurality of displays provided in the vehicle (S1010).

Afterwards, the processor 830 may control the plurality of displays so as to perform an operation corresponding to the preset input, in response to the preset input (S1020).

In the present disclosure, in a multi-display environment where a plurality of displays is provided in a vehicle, portions of a screen to be displayed on each of a number of displays may be output separately, and one big, complete virtual display may be configured by bonding a number of displays together.

Moreover, in a multi-display environment, the present disclosure may output a small screen on a large display by using a mirroring or sharing function, or may perform multi-tasking with different screens.

Among them, the present disclosure may provide an environment for performing various types of sharing or collaboration, by using a mirroring or sharing function.

In a multi-display environment, the display control device of the present disclosure may include a multi-display manager.

Specifically, the multi-display manager may store location information for a physical location of each of a plurality of displays. The location information for a physical location of each of a plurality of displays may be set by the user when the display control device is mounted to the vehicle, or display device information stored in the manufacture of the vehicle may be received from the vehicle when the display control device is connected to the vehicle.

The display control device may include a gesture-based user interface. The gesture-based user interface may sense a user input (gesture) applied to at least one of the plurality of displays.

The display control device may include a display determination unit.

The display determination unit may determine which device a screen and audio are to be outputted, with respect to a device to which a user gesture is currently inputted, based on location information of the multi-display manager, and may transmit a display (source) providing an image and a display (destination) outputting a provided image to a multi-display buffer processor.

The multi-display buffer processor may be included in the display control device.

The multi-display buffer may receive a display (source) to which a user gesture is inputted and a display (destination) for sharing or mirroring video and audio being used, copies a screen and audio buffer of the source display in real time to a screen and audio buffer of the destination display, or replace the buffer of the destination display with the buffer of the source display to implement the sharing or mirroring function.

In a conventional multi-display environment, in order to share/mirror screens and audio between displays, it is necessary to perform the step 1) of searching and registering a connectable display and the step 2) of selecting a display to mirror or share, and most user interfaces are provided in the form of a list so that the user selects an identifier of a display they want to connect.

However, in the present disclosure, a multi-display manager within a system may store location information (device configuration information) for a physical location of each display, and based on this information, may share/mirror a screen intuitively by comparing it with the directionality of a user gesture.

To this end, the multi-display manager of the display control device 800 according to the present disclosure may store and manage a relative location (location information or device configuration information) of a display unit, and may include information on a location (e.g., front seat/back seat, left/center/right) where a display is installed in a multi-display environment for vehicles.

The gesture-based user interface may track the start/movement/end point of a user input (gesture) and determine the direction of the gesture.

For example, if the gesture is a touch gesture, the start point, movement path, and end point of the touch may be tracked to recognize the direction of the gesture.

As another example, if the gesture is a spatial gesture, a camera 820 for recognizing objects may be additionally provided, and the movement direction of an object (e.g., the user's hand) recognized through the camera 820 may be tracked to recognize the direction of the gesture.

The direction of the gesture may be simply divided into four directions: front, back, left, and right, or may be divided into eight directions: front, back, left, right, front left, front right, back left, and back right.

The display determination unit may determine gesture recognizing equipment as the source display (or source device), and determine the destination display (or destination device) based on the direction of the gesture.

The display determination unit may determine the source display and the destination display variously depending on whether a gesture is applied to the display, the installation location of the display, and the direction of the gesture, which will be described later.

The display determination unit may determine the source display which provides a screen/sound and the destination display which output the screen/sound provided by the source display, and may output the ID of the source display and the ID of the destination display.

The display buffer processor may periodically copy an output buffer of the source display to a buffer of the destination display, by using the ID of the source display and the ID of the destination display which are outputted from the display determination unit, or may change an ID buffer address of the destination display to an ID buffer address of the source display so that an image outputted from the source display is outputted equally on the destination display.

The above-described multi-display manager, gesture-based user interface, display determination unit, and display buffer processor may be implemented by the processor 830 of the display control device of the present disclosure.

The multi-display manager, the gesture-based user interface, the display determination unit, and the display buffer processor may be implemented as software components, or may be implemented as independent modules.

In the present disclosure, for convenience of explanation, a description will be given on the assumption that the processor 830 equally/similarly infers and applies operations/functions/control methods performed by the multi-display manager, the gesture-based user interface, the display determination unit, and the display buffer processor.

Figure 11:
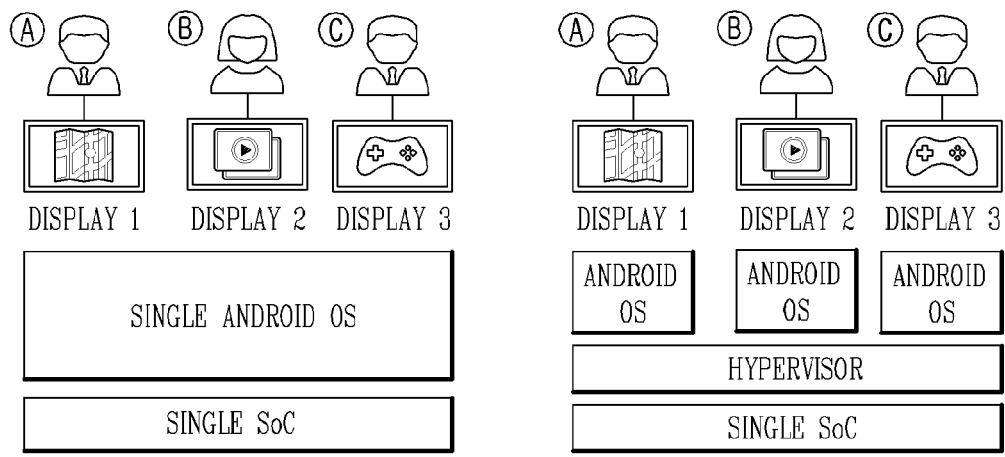
FIG. 11 are 12 are conceptual diagrams for explaining an operating environment for a display control device of the present disclosure.

FIG. 11 are 12 are conceptual diagrams for explaining an operating environment for a display control device of the present disclosure.

Referring to FIG. 11, a plurality of displays provided in the vehicle of the present disclosure may be controlled by a single OS (operating system) (e.g., a single Android OS) on a single SoC (System On Chip).

Moreover, the plurality of displays provided in the vehicle of the present disclosure may be run by different OSs (for example, the first display may be run on a Linux OS, and the second and third displays may be run on an Android OS).

In this case, as illustrated in FIG. 11, the display control device of the present disclosure may have a hypervisor so that compatibility is provided across different OSs on a single SoC. The display control device may perform data transmission/reception and sharing and/mirroring functions between different OSs through a hypervisor, even if displays provided in the vehicle are run on different OSs.

Figure 12:
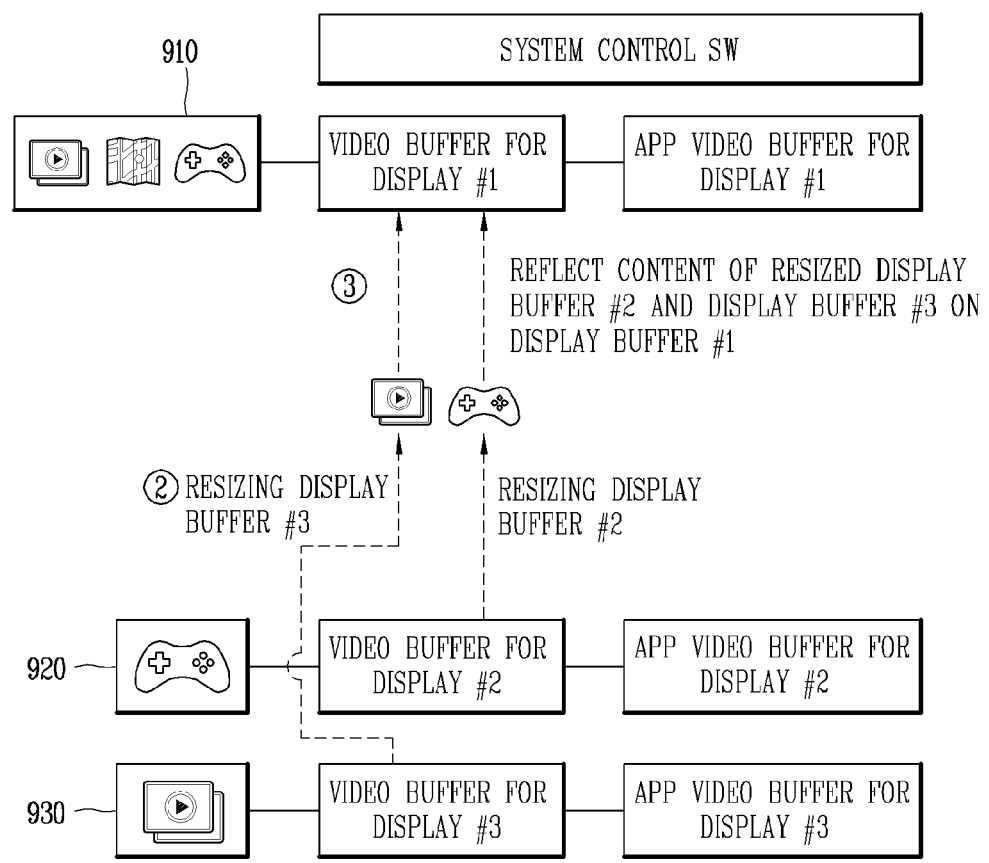

Referring to FIG. 12, the display control device of the present disclosure may be configured to control a plurality of displays on a single SoC, and to this end, system control software SW may be installed.

Among the plurality of displays provided in a vehicle of the present disclosure, the first display 910 may be installed in a position where the driver can manipulate it, and all applications (game, navigation, map, image, web, etc.) that can be run on the plurality of displays 910, 920, and 930 may be run.

Each of the plurality of displays in the present disclosure may have a buffer for loading and storing from a memory or an external server in advance, in order to play back screen information to be outputted from each display without buffering.

Upon a request for a screen sharing or mirroring function between displays by a user input (gesture), the display control device may control a buffer related to each display and resize screen information being outputted from a source display and load resized screen information to a buffer of a destination display so as to output it on the destination display.

Afterwards, the display control device may load the resized screen information to the buffer of the destination display and output it on the destination display.

In other expressions, when the user requests a screen of another display (requested display) from a particular display device (requesting display) by PIP, control SW (operating system) installed on the display control device may 1) access a display video buffer of the requested display device (Access Controller), 2) resize the content of the display video buffer of the requested display device (buffer resizer), 3) reflect the contents of the display video buffer of the resized requested display device to a specific area of the video buffer of the requesting display device (video buffer modifier), and 4) perform periodical update so that the requesting display device monitors a screen being outputted on the requested display in real time.

Through this, in the present disclosure, each display has a video buffer, and a screen running on each display device is independently outputted to the video buffer so that each display device is used as an independent device. When the user requests to monitor a screen of another display device in PIP form, the system control SW (operating system) additionally enables the following functions for the existing display buffer management to 1) access a display video buffer of the requested display device (Access Controller), 2) resize the content of the display video buffer of the requested display device (buffer resizer), 3) reflect the contents of the display video buffer of the resized requested display device to a specific area of the video buffer of the requesting display device (video buffer modifier), and 4) perform periodical update so that the requesting display device monitors a screen being outputted on the requested display in real time.

That is, the display control device of the present disclosure may include system control software, a display access controller, a buffer resizer, and a video buffer modifier.

The display access controller may 1) allocate a video buffer to each display to output a screen of an app running on each display in real time if the user has not requested a monitoring function using a PIP function and 2) have access to the video buffer of the requested display if the user has requested a monitoring function using a PIP function.

The buffer resizer may perform a function of resizing the content of the video buffer of a particular display to a small size in response to a request from the display access controller.

The video buffer modifier may perform a function of synthesizing resized requested contents provided by the buffer resizer with the video buffer of the requesting device.

In the present disclosure, when the user has requested a monitoring function using a PIP function from a particular display device, the system control S/W accesses the video buffer of the requested device through the display access controller, reduces the contents of the video buffer of that display by using the buffer resizer, and synthesizes the resized screen of the requested display with the video buffer for the requesting display by using the video buffer modifier to monitor a screen being run on the requested display in real time.

Moreover, in the present disclosure, only a user with a particular right may make a screen monitoring request using a corresponding PIP function.

According to an embodiment of the present disclosure, parents may monitor a screen being outputted on a display device their child is using in real time (for the purpose of blocking inappropriate services or content), and the driver may monitor a screen being outputted on the back seat in a vehicle environment.

The above-explained system control software, display access controller, buffer resizer, and video buffer modifier may be implemented by the processor 830 of the display control device of the present disclosure.

Hereinafter, a method in which a display control device of the present disclosure shares and/or mirrors a screen intuitively and effectively from a plurality of displays provided in a vehicle will be described in more details with reference to the accompanying drawings.

FIGS. 13, 14, 15, 16, 17, 18, 19, 20, 21, 22, 23, 24, and 25 are conceptual diagrams for explaining a display control method according to various embodiments of the present disclosure.

The display control device of the present disclosure may control displays 251 (hereinafter, three displays 910, 920, and 930, for example) provided in a vehicle through the interface unit 810 (or communication unit).

In this case, the processor 830 may receive information about a preset input applied to at least one of a plurality of displays provided in a vehicle from a display unit or the controller 170.

The information about the preset input may include user input-related information the user has inputted into a display, such as the type of user input (gesture), the start and end points of the user input, and the direction in which the user input is applied.

Upon receiving information about the preset input, the processor 830 may determine that a user input has applied to at least one of a plurality of displays provided in the vehicle.

In response to the preset input, the processor 830 may control the plurality of displays so that an operation corresponding to the preset input is performed.

The processor 830 may perform an operation corresponding to the preset input based on information on locations where the plurality of displays is provided (installed).

For example, the first display 910 may be installed at a position where it can be manipulated from the front seat in the vehicle, the second display 920 may be installed at a position where it can be manipulated from the left side of the back seat, and the third display 930 may be installed at a position where it can be manipulated from the right side of the back seat.

The installation positions of the first to third displays may be included in the location information, and the location information (or the above-described device configuration information) may be generated/determined or varied by user settings.

Moreover, the location information may be prestored in the vehicle when the vehicle is manufactured or when the plurality of displays are installed in the vehicle, and may be sent to the display control device from the vehicle in accordance with a request from the display control device.

The preset input may include various types of user inputs.

Here, the preset type of user input may include a touch input applied to the displays 251 or a user input applied to a user interface device (e.g., a button, jog dial, knob, etc. provided on the steering wheel) related to each display.

The preset type of user inputs may include various types of touches. For example, the various types of touches may include a short (or tap) touch, a long touch, a double touch, a multi touch, a drag touch, a flick touch, a pinch-in touch, a pinch-out touch, a swipe touch, a hovering touch and the like.

Hereinafter, the various types of touches will be described in more detail.

The short (or tap) touch may be a touch that a touch object, namely, an object to apply a touch, (e.g., a finger or a stylus pen) is released within a predetermined time after coming in contact with the display 251 (after a touch is applied). For example, the short (or tap) touch may be a touch that the touch object contacts the display 251 for a short time, like a single click of a mouse.

The long touch may be a touch that the touch object which has come in contact with the display 251 is maintained in the contact state for a predetermined time or longer. For example, the long touch may be a touch that is applied onto the display 251 by the touch object and then is maintained for more than a predetermined time. More concretely, the long touch may be a touch that is released after being continuously in a contact with on one point of the touch screen for more than a predetermined time. Also, the long touch may be understood as a touch corresponding to a touch and hold operation that the contact state of the touch object on the display 251 is held for more than a predetermined time.

The double touch may be a touch that a short touch is consecutively applied onto the display 251 at least two times within a predetermined time.

The predetermined time which is described in the short touch, the long touch and the double touch may be decided by user setting.

The multi-touch may be a touch that is applied onto at least two contact points of the display 251 substantially at the same time point.

The drag touch may be a touch that a contact which has started from a first point of the display 251 is continuously applied on the touch screen along one direction and then released on a second point different from the first point.

In more detail, the drag touch may be a touch that is applied to one point of the display 251 by a touch object, continuously extends on the display 251 and then is released at another point different from the one point.

Also, the drag touch may also refer to a touch which continuously extends from a touch applied onto one point of the display 251.

The flick touch may be a touch that the drag touch is applied within a predetermined time. In more detail, the flick touch may be a touch that a touch object which applies the drag touch is released from the display 251 within a predetermined time. In other words, the flick touch may be understood as a drag touch that is applied at a preset speed or more.

The swipe touch may be a drag touch applied along a straight line.

The pinch-in touch may be a touch that at least one of first and second touches applied to two different points (two points spaced from each other) on the display 251 extend to be close to the other or each other. For example, the pinch-in touch may be a touch that is realized by an operation of narrowing a gap between fingers while the fingers contact two different points spaced apart from each other on the display 251.

The pinch-out touch may be a touch that at least one of first and second touches applied to two different points (two points spaced from each other) on the display 251 extend to be away from the other or each other. For example, the pinch-out touch may be a touch corresponding to an operation of spacing fingers farther away from each other while the fingers contact two different points spaced from each other on the display 251.

The hovering touch may be a touch corresponding to an operation of a touch object at a space apart from the display 251 without touching the display 251. As one example, the hovering touch may be a proximity touch. For example, the hovering touch may be a touch corresponding to an operation that the touch object is held above one point, spaced from the display 251, for a predetermined time or more.

The force touch refers to a touch in which the touch target applies a pressure higher than a predetermined pressure to the display 251.

Also, the above-described various types of touches may be inferred/applied equally/similarly to a user input applied to a user interface device.

Moreover, the preset input may include a user gesture applied while not directly touching the display, and the user gesture may infer/apply the above-described various touch methods equally/similarly.

When a user input is applied as a user gesture which is made in a space spaced a predetermined distance from the display, the display control device may recognize the user gesture through a camera installed near (or stacked on) each display.

The preset input may include an input that is applied in a certain direction from one point and then released at another point. For example, the preset input may be implemented as a drag input, a flick input, or a swipe input which has directionality.

The preset input may be recognized as a sharing request gesture when screen sharing is dome, or as a sharing release request gesture when screen sharing is not done.

The processor 830 may control the plurality of displays so as to perform an operation corresponding to the preset input, based on at least either the positions of the plurality of displays, the display where the preset input is applied, or the certain direction in which the preset input is applied.

Here, when the preset input is applied to the at least one display, the processor 830 may switch the screen of another display positioned in the direction in which the preset input is applied, based on location information of the plurality of displays.

Figure 13:
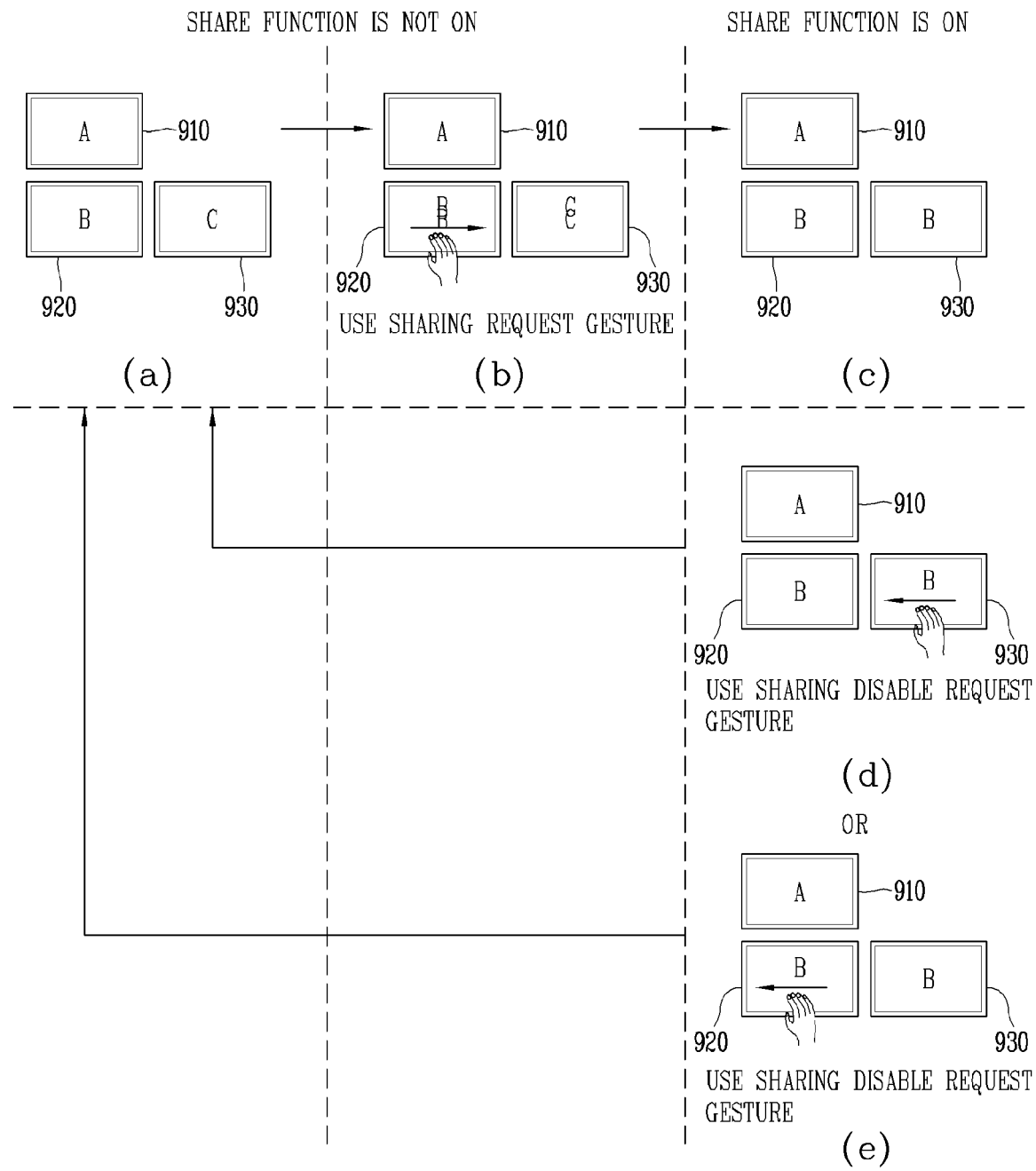
FIGS. 13, 14, 15, 16, 17, 18, 19, 20, 21, 22, 23, 24, and 25 are conceptual diagrams for explaining a display control method according to various embodiments of the present disclosure.

For example, as illustrated in (a) of FIG. 13, different screens may be outputted on the plurality of displays 910, 920, and 930.

For example, first screen information (B) is being outputted on the first display 920, among the plurality of displays, and second screen information (c) is being outputted on the second display 930 different than the first display.

The processor 830 may control the second display 930 so as to output the first screen information (B) being outputted on the first display to the second display 930 positioned in the first direction (right) with respect to the first display, as illustrated in (c) of FIG. 13, based on reception of a swipe input applied to the first display 920 in the first direction (e.g., right).

That is, when a swipe input is applied to the right of the first display 920, a screen being outputted on the first display 920 may be shared with (copied or mirrored onto) the second display 930 on the right side of the first display 920.

Accordingly, substantially the same screen B may be outputted on the first display 920 and the second display 930, based on reception of the swipe input.

Even if the manufacturers, screen sizes, picture quality, etc. of the first and second displays are different, the source of the screen information being outputted may be substantially the same. Thus, the screen information being outputted on the first and second displays may be substantially the same.

Afterwards, upon receiving a swipe input applied to the first display 920 corresponding to the source display in a second direction (left) opposite to the first direction (right), while the screen is being shared, as illustrated in (d) of FIG. 13, or upon receiving a swipe input applied to the second display 930 corresponding to the destination display, in the second direction (left) opposite to the first direction (right) as illustrated in (e) of FIG. 13, the first screen information (B) being outputted on the second display 930 may be restored (switched) to the second screen information (c) which was being outputted before the sharing.

Meanwhile, when the preset input is applied to the at least one display, the display control device 800 according to the present disclosure may switch a screen of another display positioned in a direction opposite to the direction in which the preset input is applied, based on location information of the plurality of displays.

Figure 14:
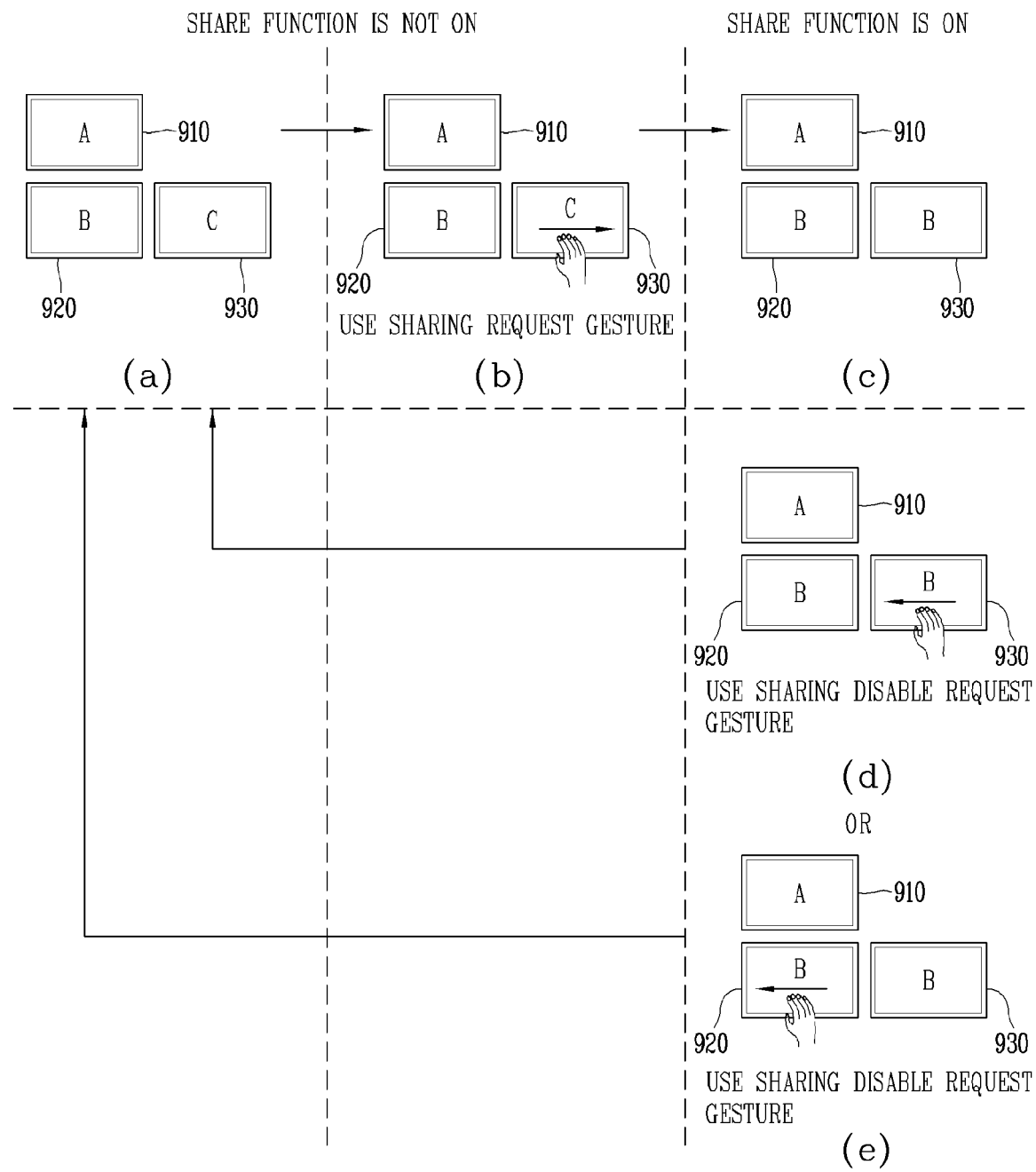

As illustrated in (a) of FIG. 14, first screen information (C) is being outputted on a first display 930, and second screen information (B) is being outputted on a second display 920 which is positioned in a first direction (e.g., left) of the first display.

As illustrated in (b) and (c) of FIG. 14, the processor 830 may control the first display 930 so that second screen information (B) being outputted on the second display 920 is outputted on the first display 930, based on reception of a swipe input on the first display 930, in a second direction (right) opposite to the first direction (left).

Afterwards, as illustrated in (d) and (e) of FIG. 14, upon receiving a swipe input applied to the first display 930 or the second display 920, in the first direction (left) opposite to the second direction (right), the processor 830 may restore the second screen information (B) being outputted on the first display 930 to the first screen information (C).

Unlike FIG. 13, in FIG. 14, a display to which a preset input is applied serves as a destination display, and a display positioned in a direction opposite to the direction in which the preset input is applied serves as a source display.

This means that a display to which the preset input is applied and a display that switches between screens according to the direction in which the preset input is applied (that is, the source display and the destination display) may be set differently.

Specifically, the processor 830 may determine a display whose screen is to be switched, based on the direction in which the preset input is applied and the position of the display to which the preset input is applied.

When the preset input is applied to a certain display in one direction, if there is another display in one direction of the certain display, the processor 830 may switch a screen of the another display.

Figure 16:
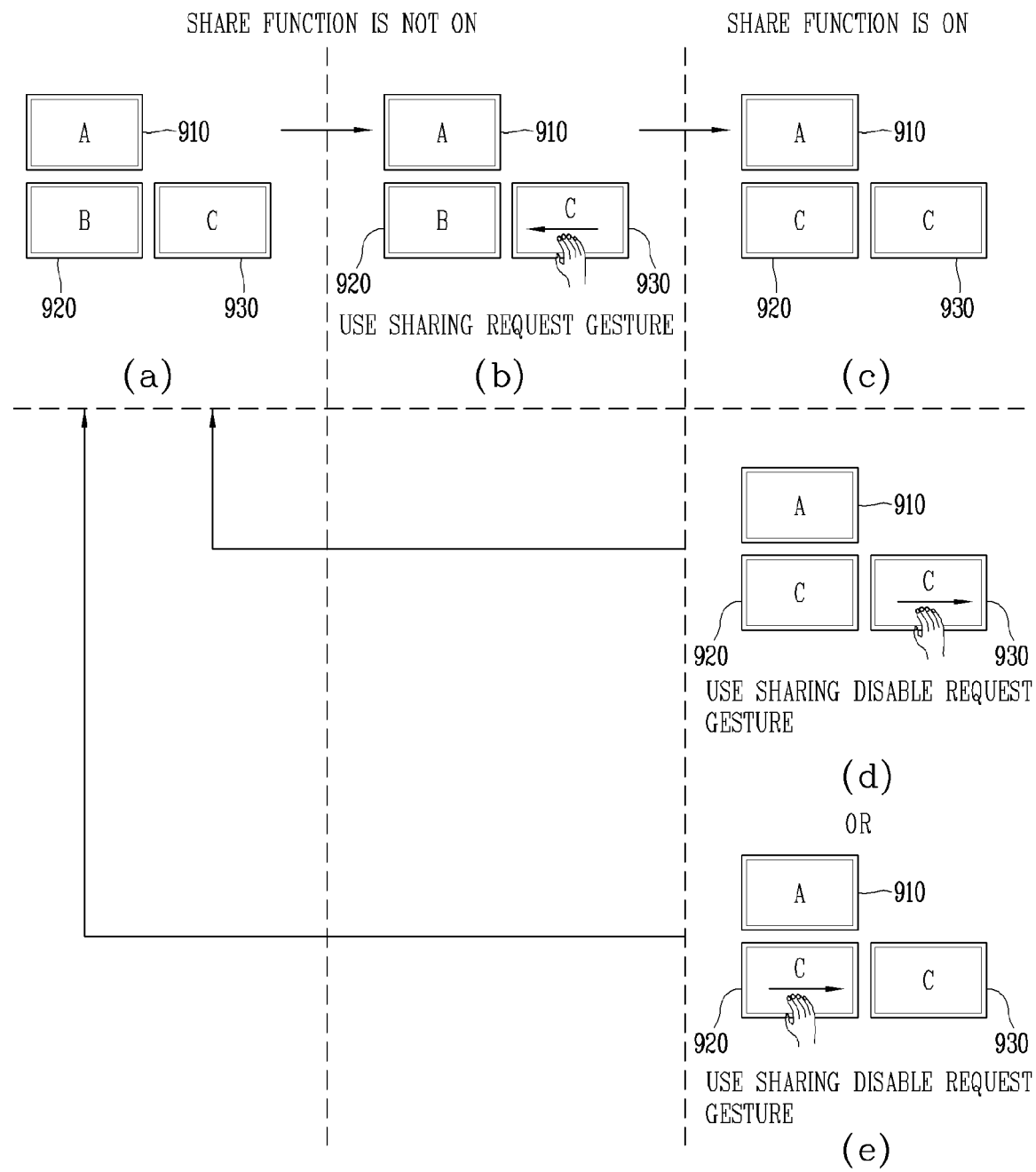

That is, when a preset input is applied to a certain display in one direction, if there is another display in the one direction of the certain display, the processor 830 may set the display to which the preset input is applied as the source display, and set the another display present in the one direction as the destination display whose screen is to be switched (corresponding to FIGS. 13 and 16).

Figure 15:
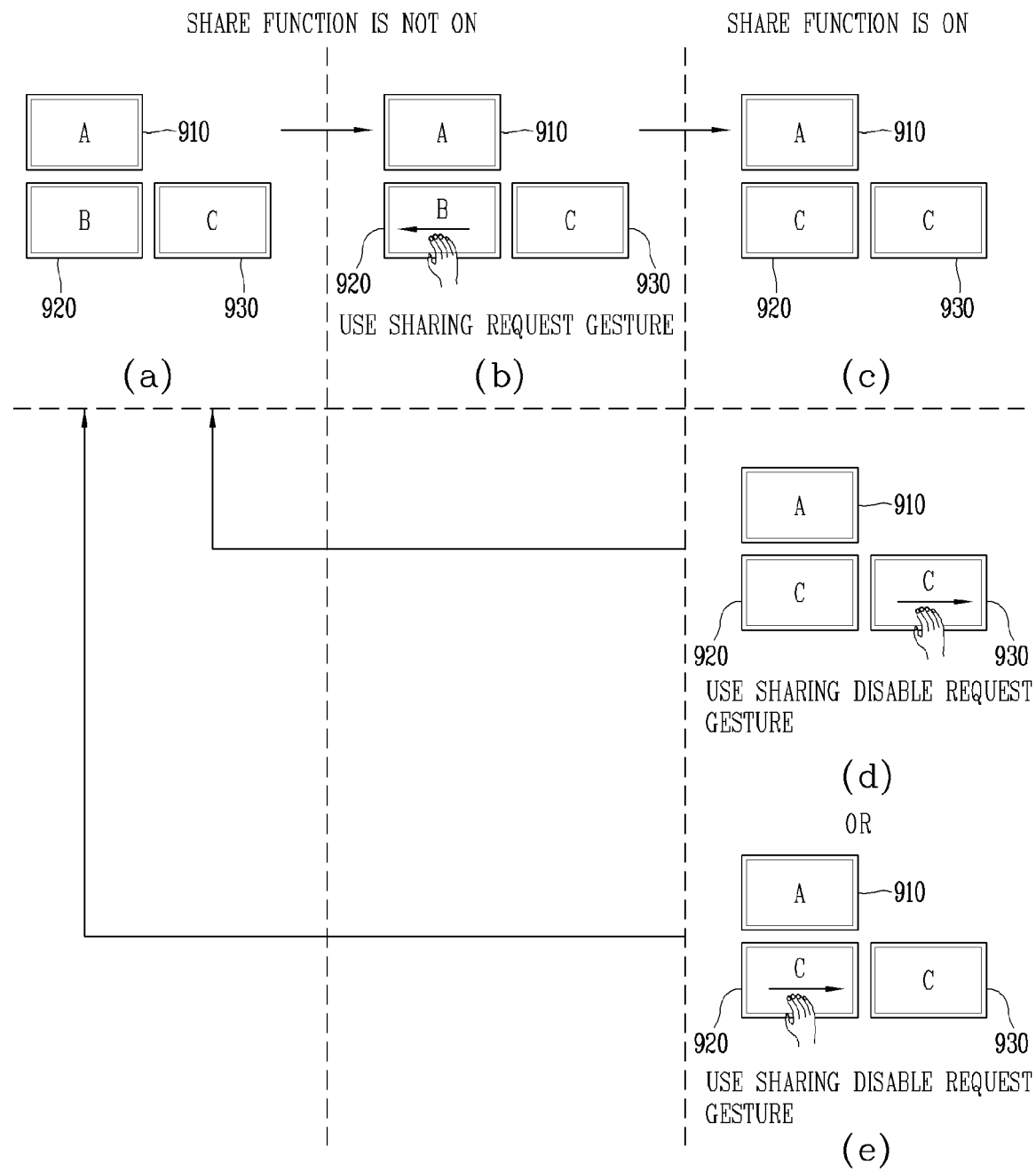

On the other hand, when the preset input is applied to a certain display in one direction, if there is no other display in one direction of the certain display, the processor 830 may switch a screen of the certain display (corresponding to FIGS. 14 and 15).

For example, as illustrated in FIG. 15, when a preset input is applied to a certain display 920 in one direction (e.g., leftward), if there is no other display in the one direction (left) of the certain display 920, the certain display 920 may be set as the destination display, and the another display 930 present in a direction (right) opposite to the one direction (left) of the certain display may be set as the source display.

Accordingly, as illustrated in (b) and (c) of FIG. 15, when a preset input is applied to a certain display 920 in one direction (left), if there is another display in the one direction of the certain display 920, the processor 830 may output screen information (C) being outputted on the display 930, which is opposite to the one direction, on the certain display 920.

This may be understood as an operation in which the certain display pulls the screen (C) of another display and shares it.

Afterwards, upon receiving a preset input in a direction (right) opposite to the one direction on the certain display and another display, the sharing function may be disabled, and the screen of the certain display 920 may be restored to the original screen (B).

In FIG. 16, as explained previously, when the preset input is applied to a certain display in one direction, if there is another display in the one direction of the certain display, the processor 830 may switch the screen of the another display.

For example, as illustrated in (b) and (c) of FIG. 16, when a preset input is applied to a certain display 930 in one direction (e.g., leftward), if there is another display 920 in the one direction (e.g., leftward) of the certain display 930, the another display may be set as the destination display, the certain display may be set as the source display, and the screen of the another display may be switched to a screen (C) of the certain display.

Afterwards, when a preset input is applied in a direction (e.g., rightward) opposite to the one direction on the certain display 930 or another display 920, the processor 830 may disable the sharing function and restore (switch) the screen of the another display 920 to the original screen (B).

In the case of FIGS. 13 and 14 explained previously, it can be inferred/applied equally and similarly that a display whose screen is to be switched may be determined based the direction in which a preset input is applied and the position of the display to which the preset input is applied.

Meanwhile, the above description may be inferred/applied equally/similarly to both front and back displays.

Figure 17:
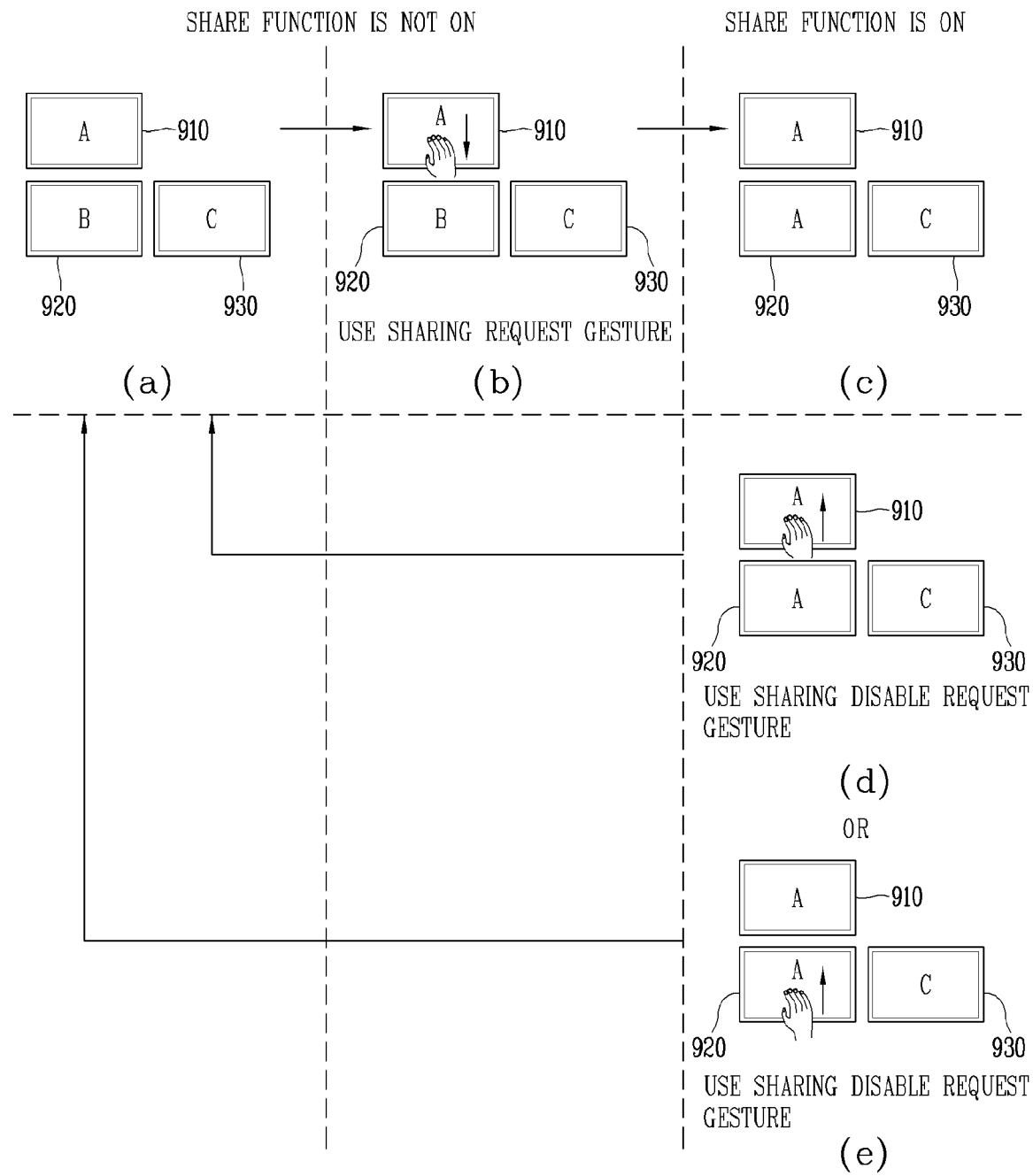

As illustrated in (b) of FIG. 17, when a preset input is applied in one direction (e.g., back) on a certain display 910, the processor 830 may output screen information A being outputted on the certain display 910 on another display 920 positioned in the one direction.

This can be understood that screen information being outputted on a certain display 910 is shared with another display 920 present in the direction in which the preset input is applied.

Afterwards, as illustrated in (d) and (e) of FIG. 17, when a preset input is applied to a certain display 910 or another display 920 (the source display or the destination display) in a direction opposite to the one direction, the processor 830 may switch the screen being shared with the another display 920 to the original screen (B).

Although not shown, when a preset input is applied in one direction (e.g., backward) on a certain display 910, if there is a plurality of displays 920 and 930 in the one direction with respect to the certain display, the processor 830 may switch all of the plurality of displays 920 and 930 to screen information (A) being outputted on the certain display 910.

In this case, when an input of a type different than that of the preset input illustrated in FIG. 17 (e.g., a drag touch with two fingers in this embodiment, whereas one finger in the case of FIG. 17) is applied, the processor 830 may switch (share) all of the plurality of displays to a screen being outputted on a certain display.

Figure 18:
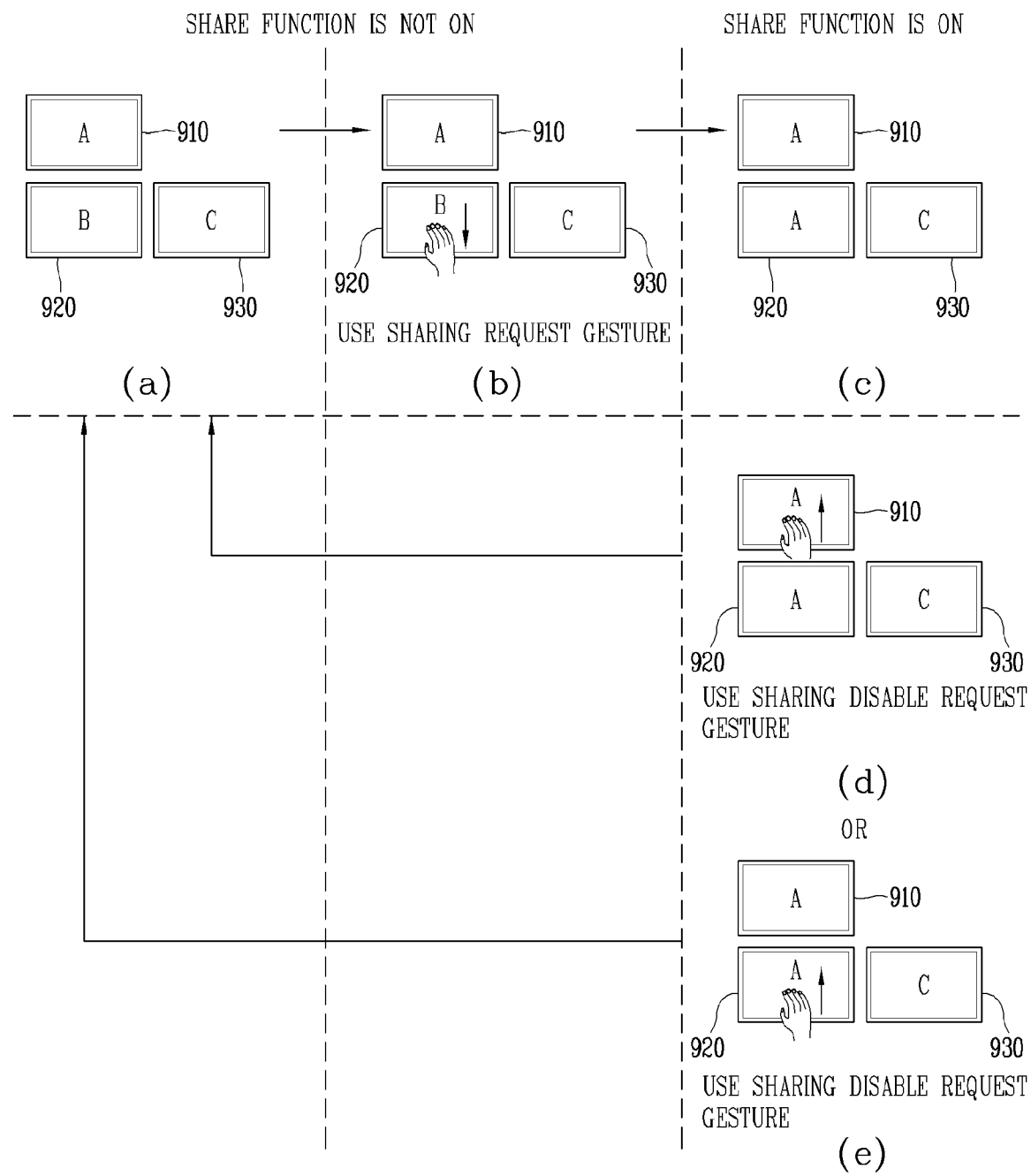

Also, as illustrated in (b) and (c) of FIG. 18, when a preset input is applied in one direction (e.g., backward) on a certain display 920, if there is no other display in the one direction with respect to the certain display 920, the processor 830 may have a screen shared by another display 910 positioned in a direction (front) opposite to the one direction, and output screen information (A) being outputted on the another display 910 to the certain display 920.

Afterwards, upon receiving a preset input in a direction opposite to the one direction on the certain display 920 or another display 910, while the screen is being shared, the processor 830 may restore the screen being outputted on the certain display 920 to the original screen (B).

What has been described with reference to FIG. 18 may be inferred/applied equally/similarly to FIG. 19.

Figure 19:
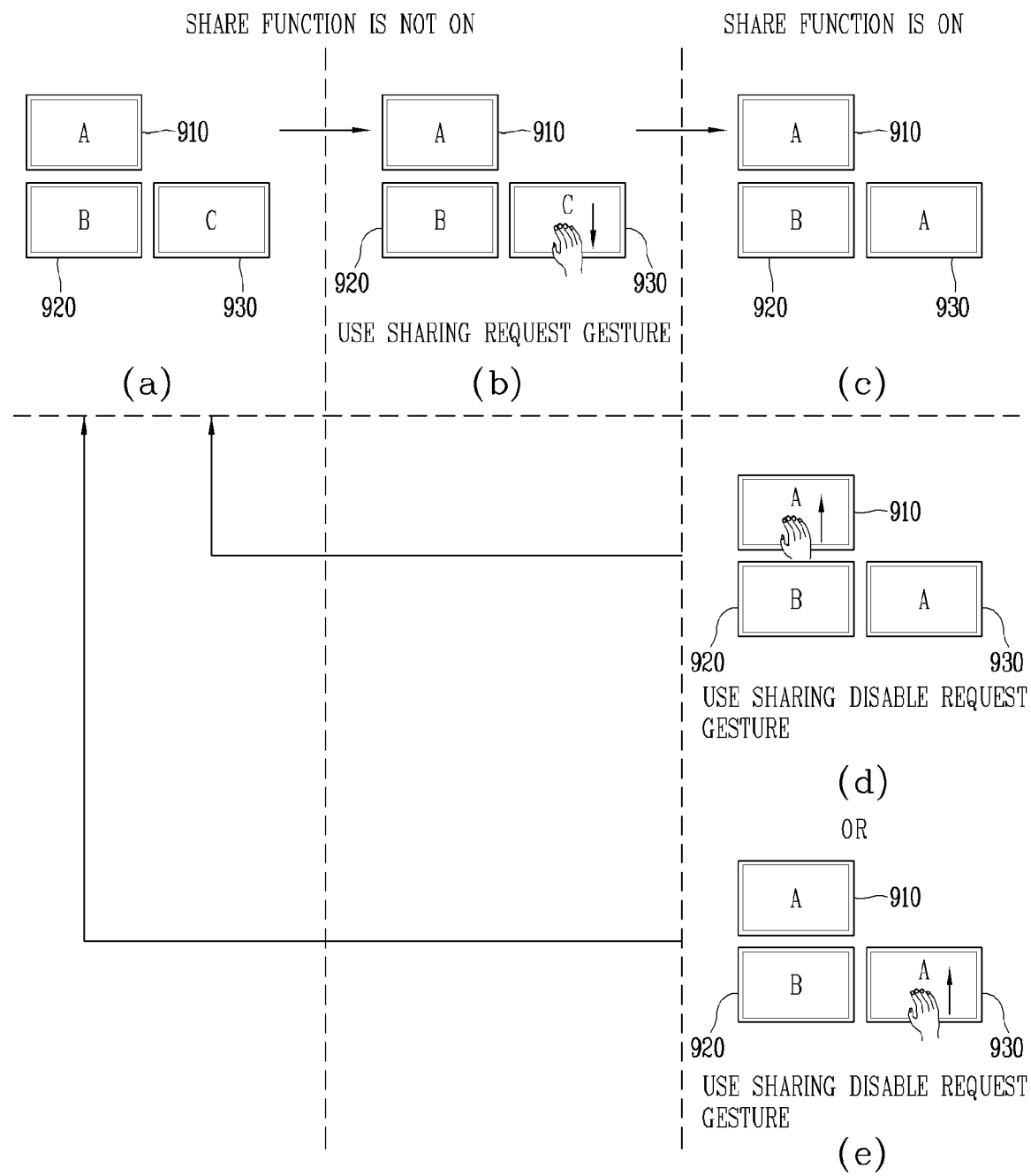

Also, as illustrated in (b) and (c) of FIG. 19, when a preset input is applied in one direction (e.g., backward) on a certain display 930, if there is no other display in the one direction with respect to the certain display 930, the processor 830 may have a screen shared by another display 910 positioned in a direction (front) opposite to the one direction and output screen information (A) being outputted on the another display 910 to the certain display 930.

If there is any other display (not shown) on the right side of the another display 910 and the front side of the certain display 930, the processor 830 may share and output an output screen of the any other display on the certain display 930.

On the other hand, if there is no other display in the direction in which the preset input is applied with respect to the display to which the preset input is applied, the certain display 930 may have a screen shared by the another display 910 present in the opposite direction.

Figure 20:
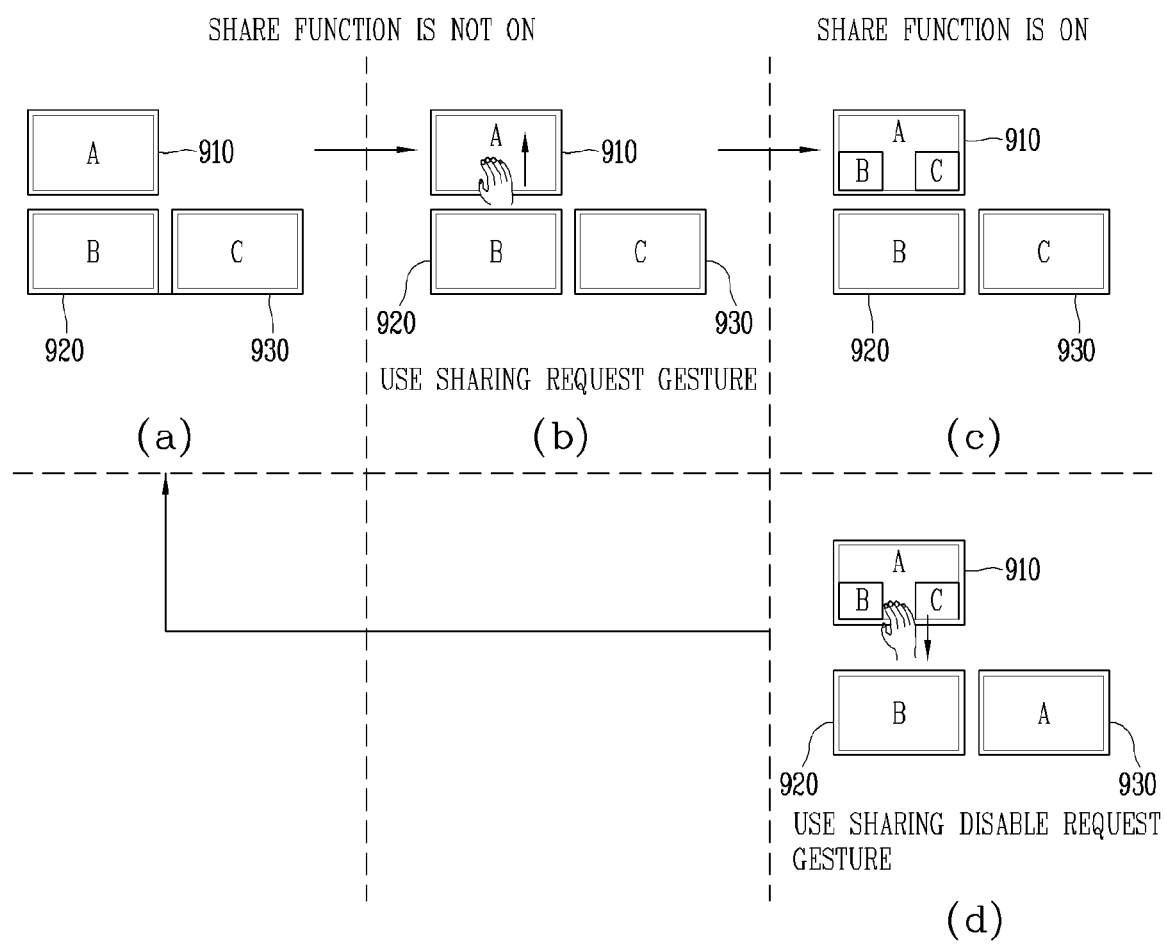

Meanwhile, as illustrated in (b) and (c) of FIG. 20, if there are at least two displays in the opposite direction (back) of the direction (front) in which the preset input is applied, screen information (B, C) being outputted on the at least two displays 920 and 930 may be outputted on the display 910 to which the preset input is applied.

In this case, as illustrated in (c) of FIG. 20, the screen information (B, C) being outputted on the at least two displays may overlap the screen information (A) being outputted on the display 910 to which the preset input is applied.

On the other hand, as illustrated in (d), when a preset input is applied in a direction (e.g., back) opposite to the one direction on the certain display 910 or the at least two displays, the processor 830 may disable the sharing function, and control the certain display 910 so that the screen information (B, C) being outputted on the at least two displays disappear from the certain display.

Meanwhile, the display control device of the present disclosure may perform communication with a plurality of cameras provided in the vehicle, and may output images received through the cameras on a display in an optimized manner.

The interface unit 810 (or communication unit) provided in the display control device of the present disclosure may be configured to receive images from a plurality of cameras A, B, C, and D provided in the vehicle.

Based on a direction in which the preset input (e.g., a swipe, drag, or flick input with a directionality) is applied to a display provided in the vehicle, the processor 830 may receive images from different cameras and output the images to the display to which the preset input is applied.

Figure 21:
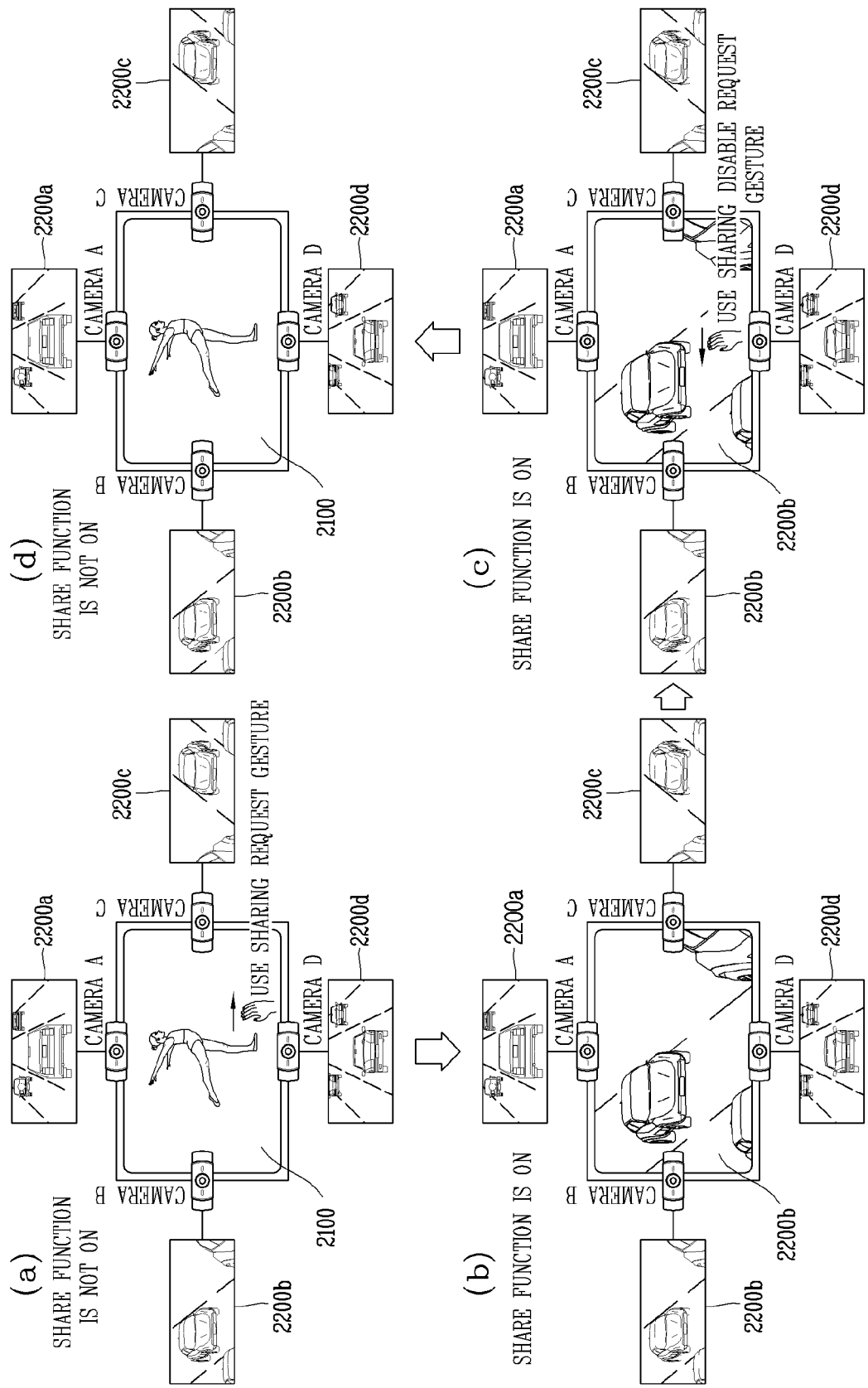

Referring to FIG. 21, as illustrated in (a) of FIG. 21, when a preset input is applied to the display in a first direction (right), the processor 830 may receive an image 2200b from a first camera (Camera B) installed at a position (left) opposite to the direction, among the plurality of cameras, and displays the image on the display, as illustrated in (b) of FIG. 21.

Figure 22:
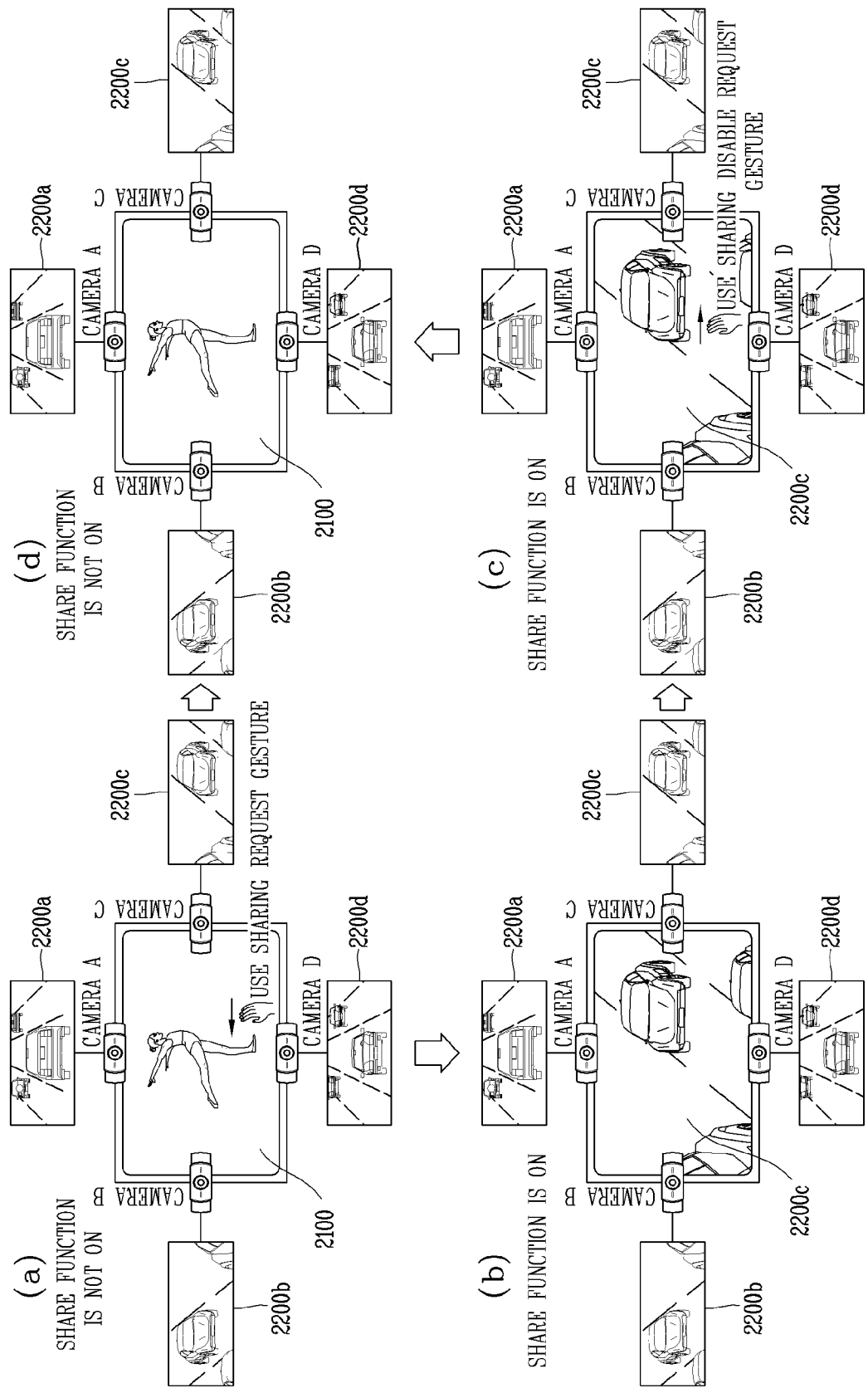
Figure 23:
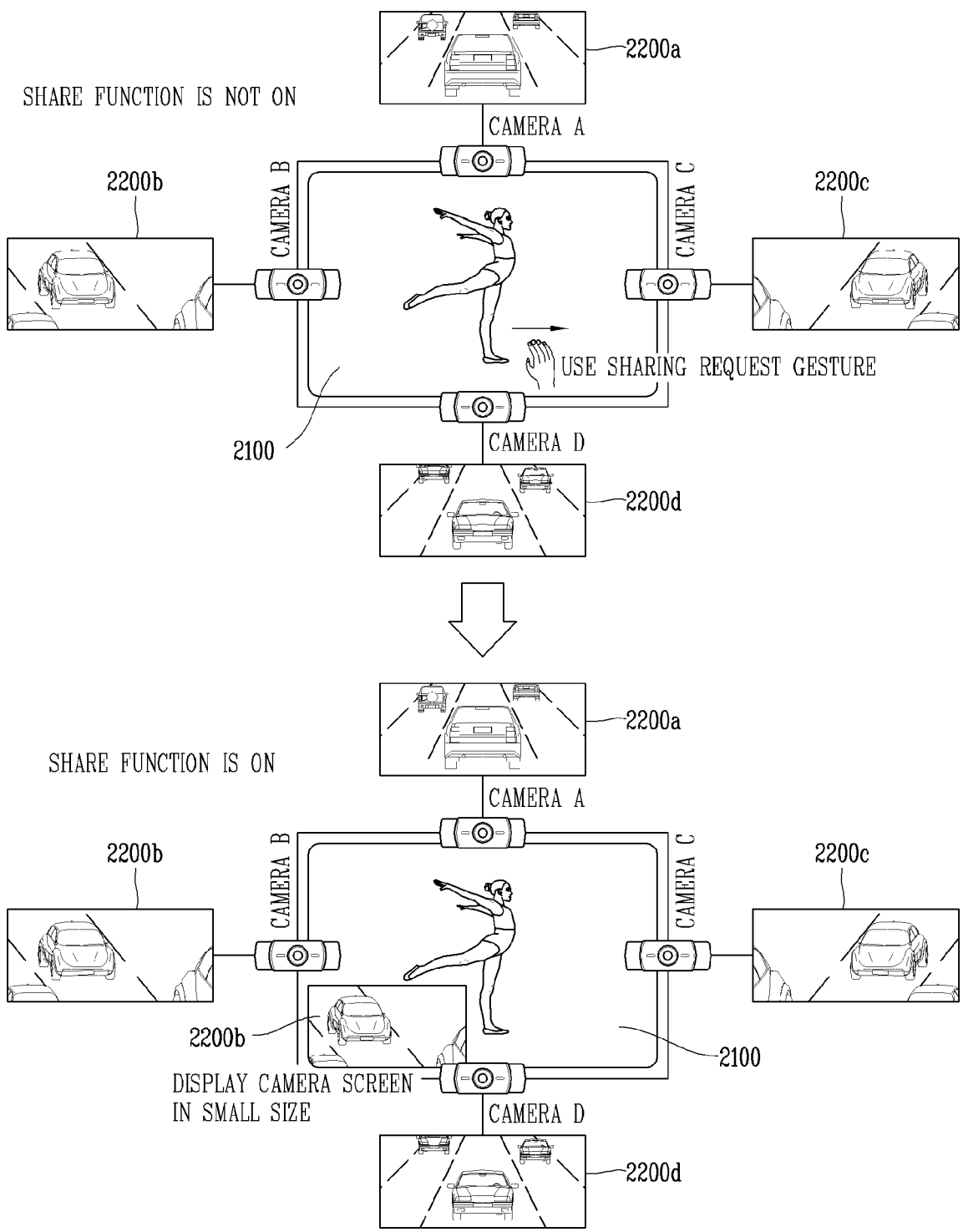

As illustrated in (a) of FIG. 22, when a preset input is applied to the display in a second direction (left) different from the first direction (right), the processor 830 may receive an image 2200c from a second camera (Camera C) installed at a position (right) opposite to the second direction (left), among the plurality of cameras, and output the image on the display, as illustrated in (c) of FIG. 22.

The position opposite to the first direction may refer to a position that indicates a direction opposite to the first direction. Also, the position opposite to the first direction may be represented as a position opposed to the first direction, and if the first direction is the right side, the position opposed to the first direction may refer to the left side with respect to the vehicle.

The position opposite to the second direction may refer to a position that indicates a direction opposite to the second direction. Also, the position opposite to the second direction may be represented as a position opposed to the first direction, and if the second direction is the left side, the position opposed to the second direction may refer to the right side with respect to the vehicle.

As illustrated in (c) of FIG. 21, when a preset input is applied in a direction (left) opposite to the first direction (right), while the image 2200b received through the camera is being outputted on the display, the processor 830 may stop image transmission from the camera (Camera B) and output originally outputted screen information 2100 on the display, as illustrated in (d) of FIG. 21.

Likewise, as illustrated in (c) of FIG. 22, when a preset input is applied in a direction (right) opposite to the second direction (left), while the image 2200c received through a camera is being outputted on the display, the processor 830 may stop image transmission from the camera (Camera C) and output the originally outputted screen information 2100 on the display, as illustrated in (d) of FIG. 22.

Meanwhile, upon receiving a preset input of a first type, the processor 830 may switch the screen 2100 being outputted on the display to the image transmitted from the camera, as illustrated in (a) and (b) of FIG. 21 and (a) and (b) of FIG. 22.

On the other hand, upon receiving a preset input of a second type different from the first type, the processor 830 may output the image 2200b transmitted from the camera in such a way as to overlap some region of the display, as illustrated in (b) of FIG. 22.

In this case, although not shown, the processor 830 may set (determine) some region of the display where an image transmitted from a camera is outputted, based on a direction in which the preset input of the second type is applied.

For example, if the direction in which the preset input of the second type is applied is a first direction (e.g., right), the processor 830 may output the image 2200b received from a camera (Camera B) present at a position opposite to the first direction in some region of the display present in a direction (e.g., left) opposite to the first direction.

As another example, if the direction in which the preset input of the second type is applied is a second direction (e.g., left) different from the first direction, the processor 830 may output the image 2200c received from a camera (Camera C) present at a position opposite to the second direction in some region of the display present in a direction (e.g., right) opposite to the second direction.

Figure 24:
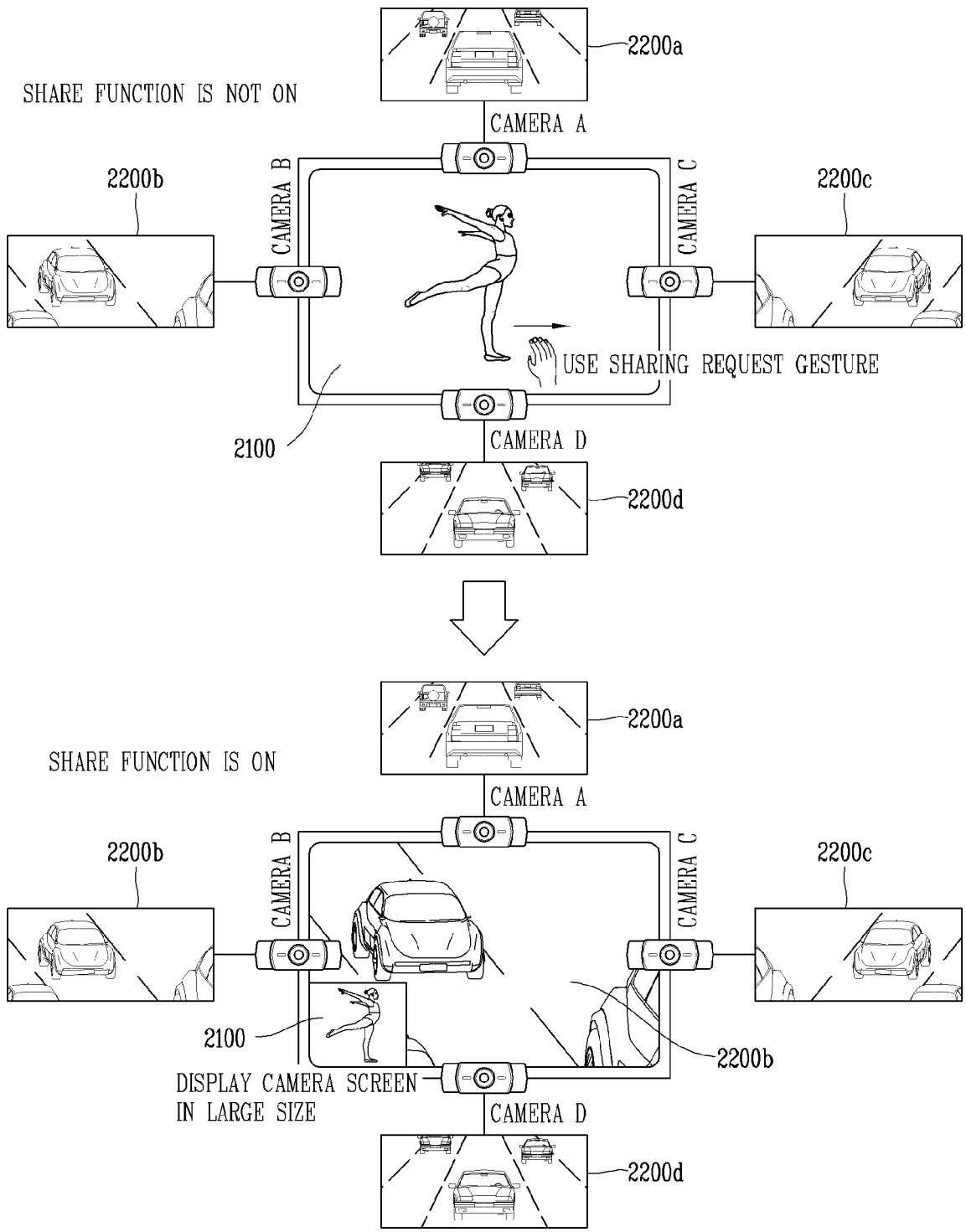

On the other hand, upon receiving a preset input of a third type different from the first and second types, the processor 830 may reduce the screen 2100 being outputted on the display and output the reduced screen 2100 in such a way as to overlap the image 2200b transmitted from the camera, as illustrated in FIG. 24.

In this case, the processor 830 may output the reduced screen at different positions, based on the direction in which the preset input of the third type is applied. Also, the processor 830 may receive different images from different cameras, based on the direction in which the preset input of the third type is applied.

For example, as illustrated in FIG. 24, if the direction in which the preset input of the third type is a first direction (e.g., right), a first image 2200b may be received from a camera (Camera B) present at a position opposite to the first direction and output it on the display unit, and may reduce and output the screen 2100 being outputted on the display at the position (left side) opposite to the first direction.

Figure 25:
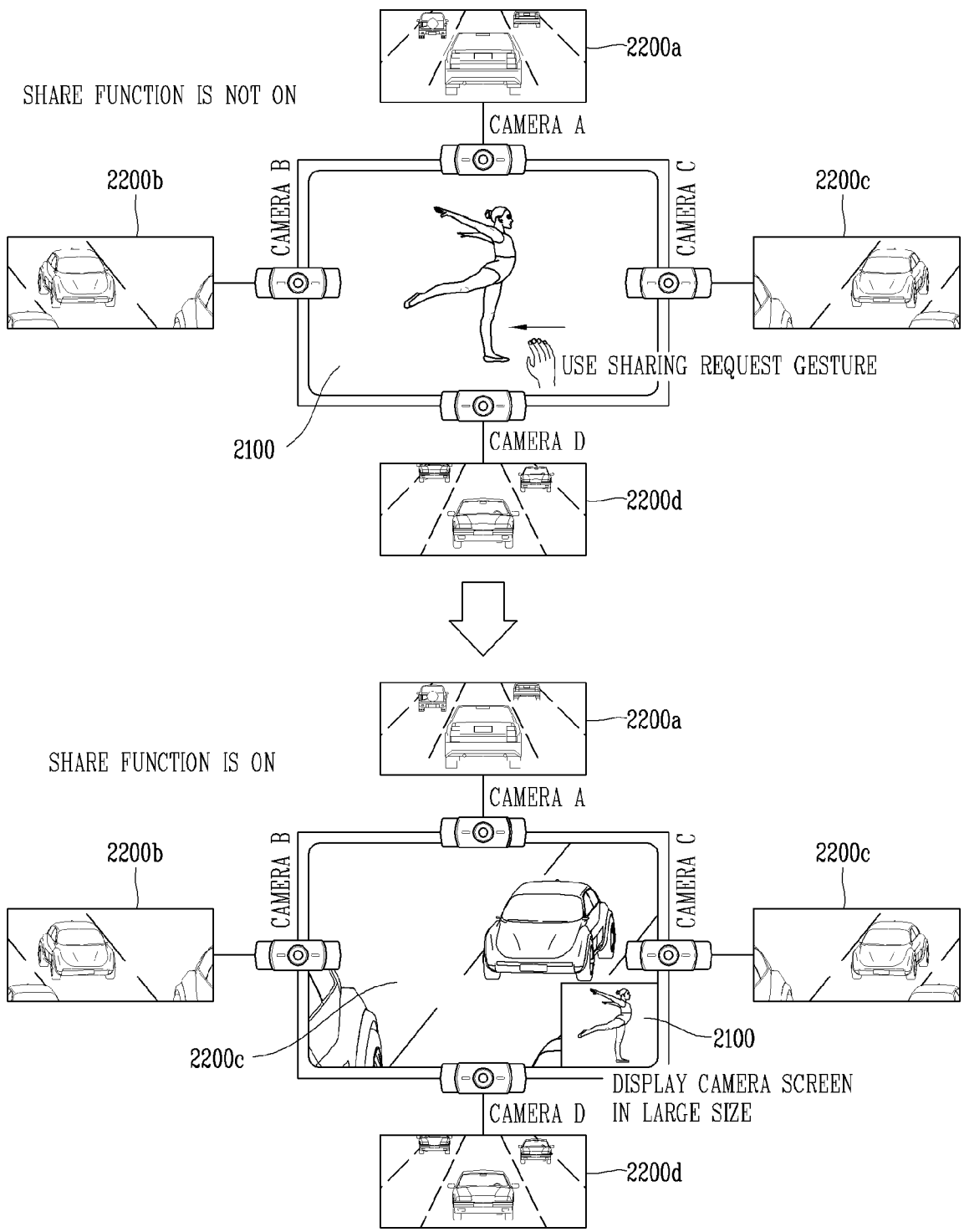

For example, as illustrated in FIG. 25, if the direction in which the preset input of the third type is applied is a second direction (e.g., left), a second image 2200C may be received from a camera (Camera C) present at a position opposite to the second direction and output it on the display unit, and may reduce and output the screen 2100 being outputted at a position (right) opposite to the first direction.

In accordance with an embodiment of the present disclosure, one or more of the following effects are provided.

First, the present disclosure provides a user interface capable of controlling a plurality of displays provided in a vehicle in an optimal manner.

Second, the present disclosure provides an optimized UI/UX capable of intuitively performing screen sharing/mirroring between a plurality of displays provided in a vehicle.

Third, the present disclosure provides a new display system with improved compatibility so as to facilitate screen sharing between a plurality of displays even if they have different OSs.

The effects of the present disclosure may not be limited to those effects mentioned above, and other effects not mentioned may be clearly understood by those skilled in the art from the description of the appended claims.

The display control device 800 described above may be included in the vehicle 100.

The operation or control method of the display control device 800 described above may be applied to an operation or control method of the vehicle 100 (or the control unit 170) in the same or similar manner.

More detailed embodiments will be replaced with the aforementioned description or applied in the same/like manner.

Each of the steps may be performed not only by the display control device 800 but also by the controller 170 provided in the vehicle 100.

Further, all functions, configurations, or control methods performed by the display control device 800 described above may be performed by the controller 170 provided in the vehicle 100. That is, all of the control methods described in this specification may be applied to a control method of a vehicle or a control method of a control device.

Further, the display control device 800 described above may be a mobile terminal. Further, all functions, configurations, or control methods performed by the display control device 800 described above may be performed by a controller provided in the mobile terminal. In addition, all the control methods described in this specification can be applied to a method of controlling a mobile terminal in the same/like manner.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. A display control device comprising:
   a processor which controls a plurality of displays provided in a vehicle, wherein the processor is configured to receive information about a preset input applied to at least one of the plurality of displays provided in the vehicle, and control the plurality of displays in response to the preset input so that an operation corresponding to the preset input is performed, wherein each of the plurality of displays has a video buffer for loading and storing screen information, wherein in response to a request for a screen sharing function between the plurality of displays by the preset input, the processor is further configured to:

resize screen information being outputted from a source display of the plurality of displays; and load the resized screen information to a video buffer of a destination display of the plurality of displays so as to output the resized screen information on the destination display, and wherein the processor comprises:

a display access controller configured to allocate the video buffer for each display of the plurality of displays to output a screen of an app running on each display in real time;

a buffer resizer configured to perform a function of resizing screen information of a video buffer of the source display to a small size in response to a request from the display access controller; and a video buffer modifier configured to perform a function of synthesizing resized requested screen information provided by the buffer resizer with the video buffer of the destination display.

2. The display control device of claim 1, wherein the processor performs an operation corresponding to the preset input, based on location information of the plurality of displays.

3. The display control device of claim 2, wherein the preset input includes an input that is applied in a certain direction from one point and then released at another point, and the processor controls the plurality of displays so as to perform the operation based on at least the location information of the plurality of displays, the at least one display where the preset input is applied, or the certain direction in which the preset input is applied.

4. The display control device of claim 1, wherein, when the preset input is applied to the at least one display, the processor switches a screen of another display of the plurality of displays positioned in a direction in which the preset input is applied, based on the location information of the plurality of displays.

5. The display control device of claim 4, wherein, while first screen information is being outputted on a first display of the plurality of displays, and second screen information is being outputted on a second display of the plurality of displays, based on the preset input being a swipe input applied to the first display in a first direction, the processor controls the second display to output the first screen information being outputted on the first display based on the second display being positioned in the first direction with respect to the first display.

6. The display control device of claim 5, wherein a same screen information is outputted on the first display and the second display, based on reception of the swipe input.

7. The display control device of claim 5, wherein, upon receiving another swipe input applied to the first display or the second display in a second direction opposite to the first direction, the processor restores the second screen information to be outputted on the second display.

8. The display control device of claim 1, wherein, while first screen information is being outputted on a first display of the plurality of displays, and second screen information is being outputted on a second display of the plurality of displays, based on the preset input being a swipe input applied to the first display in a first direction, the processor controls the first display to output the second screen information being outputted on the second display based on the second display being positioned in a second direction with respect to the first display that is opposite to the first direction.

9. The display control device of claim 8, wherein, upon receiving another swipe input applied to the first display or the second display in the first direction opposite to the second direction, the processor restores the first screen information to be outputted on the first display.

10. The display control device of claim 1, wherein the processor determines one of the plurality of displays whose screen is to be switched, based on the direction in which the preset input is applied and a position of the one display to which the preset input is applied.

11. The display control device of claim 10, wherein, when the preset input is applied to the one display in one direction, based on there being another display of the plurality of displays in the one direction with respect to the one display, the processor switches a screen of the another display.

12. The display control device of claim 10, wherein, when the preset input is applied to the one display in one direction, based on there being no other displays in the one direction with respect to the one display, the processor switches a screen of the one display.

13. The display control device of claim 10, wherein, when the preset input is applied to the one display in one direction, based on there being at least two displays in an opposite direction to the one direction with respect to the one display, the processor displays on the one display screen information being outputted on the at least two displays.

14. The display control device of claim 13, wherein the screen information being outputted on the at least two displays overlaps screen information being outputted on the one display to which the preset input is applied.

15. The display control device of claim 1,
wherein, based on a direction in which the preset input is applied to one of the plurality of displays, the processor receives images from at least one camera among a plurality of cameras provided in the vehicle and outputs the received images to the one display to which the preset input is applied.

16. The display control device of claim 15, wherein, when the preset input is applied to the one display in a first direction, the images are received from a first camera installed at a position opposite to the first direction, among the plurality of cameras, and when the preset input is applied to the one display in a second direction different from the first direction, the images are received from a second camera installed at a position opposite to the second direction, among the plurality of cameras.

17. The display control device of claim 15, wherein, upon receiving a preset input of a first type, the processor switches a screen being outputted on the one display to the images received from the at least one camera, and Upon receiving a preset input of a second type different from the first type, the processor outputs the images received from the at least one camera in such a way as to overlap some region of the one display.

18. The display control device of claim 17, wherein, upon receiving a preset input of a third type different from the first and second types, the processor reduces the screen being outputted on the one display and outputs the reduced screen in such a way as to overlap the images received from the at least one camera.

19. The display control device of claim 18, wherein the processor outputs the reduced screen at different positions, based on the direction in which the preset input of the third type is applied.

* * * * *